(12) United States Patent
Kamada et al.

(10) Patent No.: US 12,724,995 B2
(45) Date of Patent: Sep. 1, 2026

(54) COLOR CORRECTION DEVICE, PRINTING SYSTEM, COLOR CORRECTION METHOD, AND NON-TRANSITORY COMPUTER-READABLE STORAGE MEDIUM STORING PROGRAM

(71) Applicant: SEIKO EPSON CORPORATION, Tokyo (JP)

(72) Inventors: Takahiro Kamada, Matsumoto (JP); Mitsuhiro Yamashita, Matsumoto (JP); Yuko Yamamoto, Shiojiri (JP); Takuya Ono, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 309 days.

(21) Appl. No.: 18/638,828

(22) Filed: Apr. 18, 2024

(65) Prior Publication Data

US 2024/0354538 A1 Oct. 24, 2024

(30) Foreign Application Priority Data

Apr. 19, 2023 (JP) ................................ 2023-068309

(51) Int. Cl.
*G06K 15/02* (2006.01)
*B41J 2/21* (2006.01)

(52) U.S. Cl.
CPC ............ *G06K 15/1878* (2013.01); *B41J 2/21* (2013.01); *G06K 15/1822* (2013.01); *G06K 15/1848* (2013.01); *G06K 2215/101* (2013.01)

(58) Field of Classification Search
None
See application file for complete search history.

(56) References Cited

U.S. PATENT DOCUMENTS

2020/0364015 A1* 11/2020 Katsuzawa ........... G06F 3/1255
2024/0354536 A1* 10/2024 Ono ........................... B41J 2/21
2024/0354537 A1* 10/2024 Ono ........................... B41J 2/21
2024/0357048 A1* 10/2024 Ono ..................... H04N 1/6008

FOREIGN PATENT DOCUMENTS

JP 2002-152536 A 5/2002
JP 2018-082360 A 5/2018

* cited by examiner

*Primary Examiner* — Dov Popovici
(74) *Attorney, Agent, or Firm* — Harness, Dickey & Pierce, P.L.C.

(57) ABSTRACT

A color correction device includes: a color conversion unit to convert an input value in an input color space into an output value in an output color space; a selection unit to receive a selection, as a target color component, of one or more color components used in a printing device; and a correction unit to execute a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component.

14 Claims, 23 Drawing Sheets

IMAGE PROCESSING DEVICE
100
PRINTING DATA GENERATION UNIT
140
HT PROCESSING UNIT
144
COLOR SEPA-RATION UNIT
142
CORRECTION UNIT
120
SELECTION UNIT
130
COLOR CONVER-SION UNIT
110
COLOR CON-VERSION LUT
112
CMYK
CMYK
CMYKLcLm
PRINTING DEVICE
400
INPUT IMAGE DATA
IM
INPUT PROFILE
IPF
OUTPUT PROFILE
OPF

FIG. 7
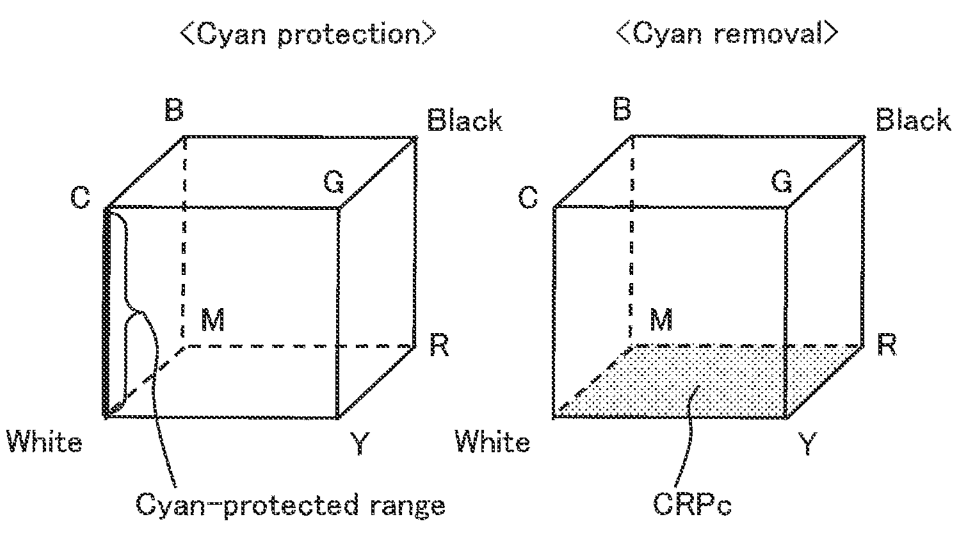
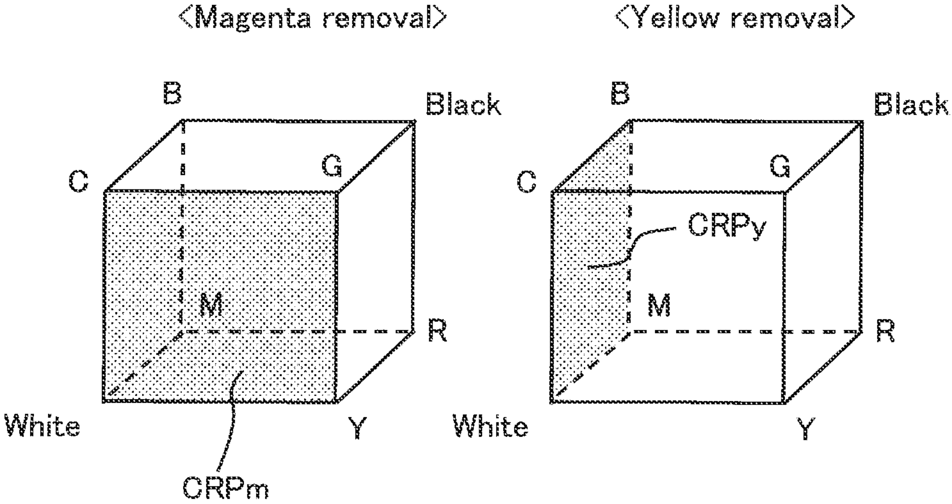

FIG. 8

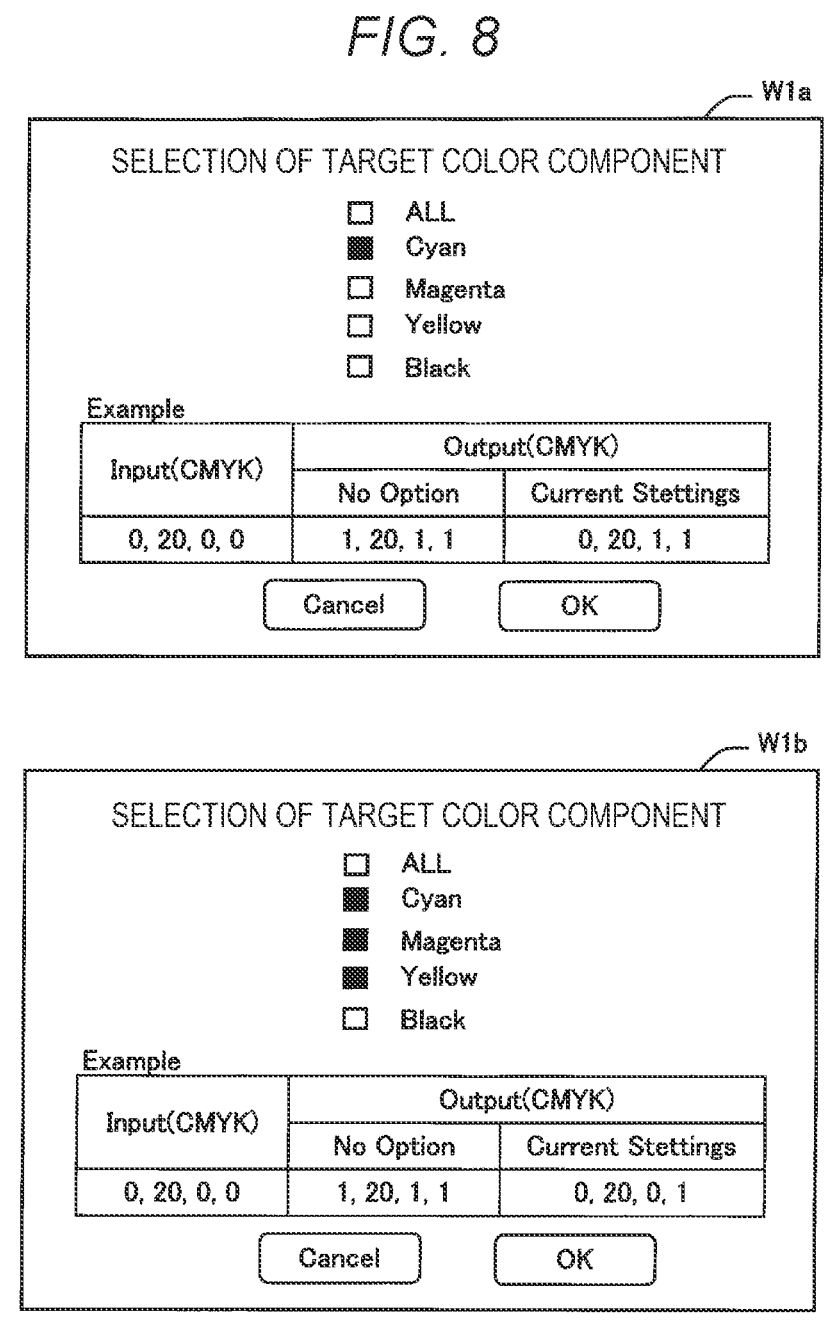

| Input(CMYK) | Output(CMYK) | |
|---|---|---|
| | No Option | Current Stettings |
| 0, 20, 0, 0 | 1, 20, 1, 1 | 0, 20, 1, 1 |

| Input(CMYK) | Output(CMYK) | |
|---|---|---|
| | No Option | Current Stettings |
| 0, 20, 0, 0 | 1, 20, 1, 1 | 0, 20, 0, 1 |

FIG. 9

<NON-INPUT-COLOR REMOVAL + NON-TARGET-COLOR COMPONENT CORRECTION: TARGET COLOR COMPONENT = ALL CMYK>

| | INPUT VALUE | | | | | OUTPUT VALUE | | | | | CORRECTED OUTPUT VALUE | | | |
|---|---|---|---|---|---|---|---|---|---|---|---|---|---|---|
| | C | M | Y | K | | C | M | Y | K | | C | M | Y | K |
| PRIMARY COLOR | 80 | 0 | 0 | 0 | → | 78 | 2 | 2 | 0 | → | 82 | 0 | 0 | 0 |
| SECONDARY COLOR | 0 | 80 | 80 | 0 | → | 2 | 78 | 77 | 0 | → | 0 | 79 | 78 | 0 |
| TERTIARY COLOR | 20 | 20 | 20 | 0 | → | 18 | 18 | 18 | 4 | → | 19 | 19 | 19 | 0 |

<NON-INPUT-COLOR REMOVAL + NON-TARGET-COLOR COMPONENT CORRECTION: TARGET COLOR COMPONENT = CMY>

| | INPUT VALUE | | | | | OUTPUT VALUE | | | | | CORRECTED OUTPUT VALUE | | | |
|---|---|---|---|---|---|---|---|---|---|---|---|---|---|---|
| | C | M | Y | K | | C | M | Y | K | | C | M | Y | K |
| PRIMARY COLOR | 80 | 0 | 0 | 0 | → | 78 | 2 | 2 | 0 | → | 82 | 0 | 0 | 0 |
| SECONDARY COLOR | 0 | 80 | 80 | 0 | → | 2 | 78 | 77 | 0 | → | 0 | 79 | 78 | 0 |
| TERTIARY COLOR | 20 | 20 | 20 | 0 | → | 18 | 18 | 18 | 4 | → | 18 | 18 | 18 | 4 |

<NON-INPUT-COLOR REMOVAL + NON-TARGET-COLOR COMPONENT CORRECTION: TARGET COLOR COMPONENT = C>

| | INPUT VALUE | | | | | OUTPUT VALUE | | | | | CORRECTED OUTPUT VALUE | | | |
|---|---|---|---|---|---|---|---|---|---|---|---|---|---|---|
| | C | M | Y | K | | C | M | Y | K | | C | M | Y | K |
| PRIMARY COLOR | 80 | 0 | 0 | 0 | → | 78 | 2 | 2 | 0 | → | 78 | 2 | 2 | 0 |
| SECONDARY COLOR | 0 | 80 | 80 | 0 | → | 2 | 78 | 77 | 0 | → | 0 | 79 | 78 | 0 |
| TERTIARY COLOR | 20 | 20 | 20 | 0 | → | 18 | 18 | 18 | 4 | → | 18 | 18 | 18 | 4 |

○ : NON-INPUT-COLOR REMOVAL

□ : NON-TARGET-COLOR COMPONENT CORRECTION

STEP S30
S31
SELECT ONE GRID POINT OF COLOR CONVERSION LUT
S32
TARGET COLOR COMPONENT IN INPUT VALUES IS ZERO?
No
Yes
S33
CORRECT TARGET COLOR COMPONENT IN OUTPUT VALUES
S34
CORRECT NON-TARGET-COLOR COMPONENT IN OUTPUT VALUES
S35
ALL GRID POINTS ARE ENDED?
No
Yes
RETURN

FIG. 13

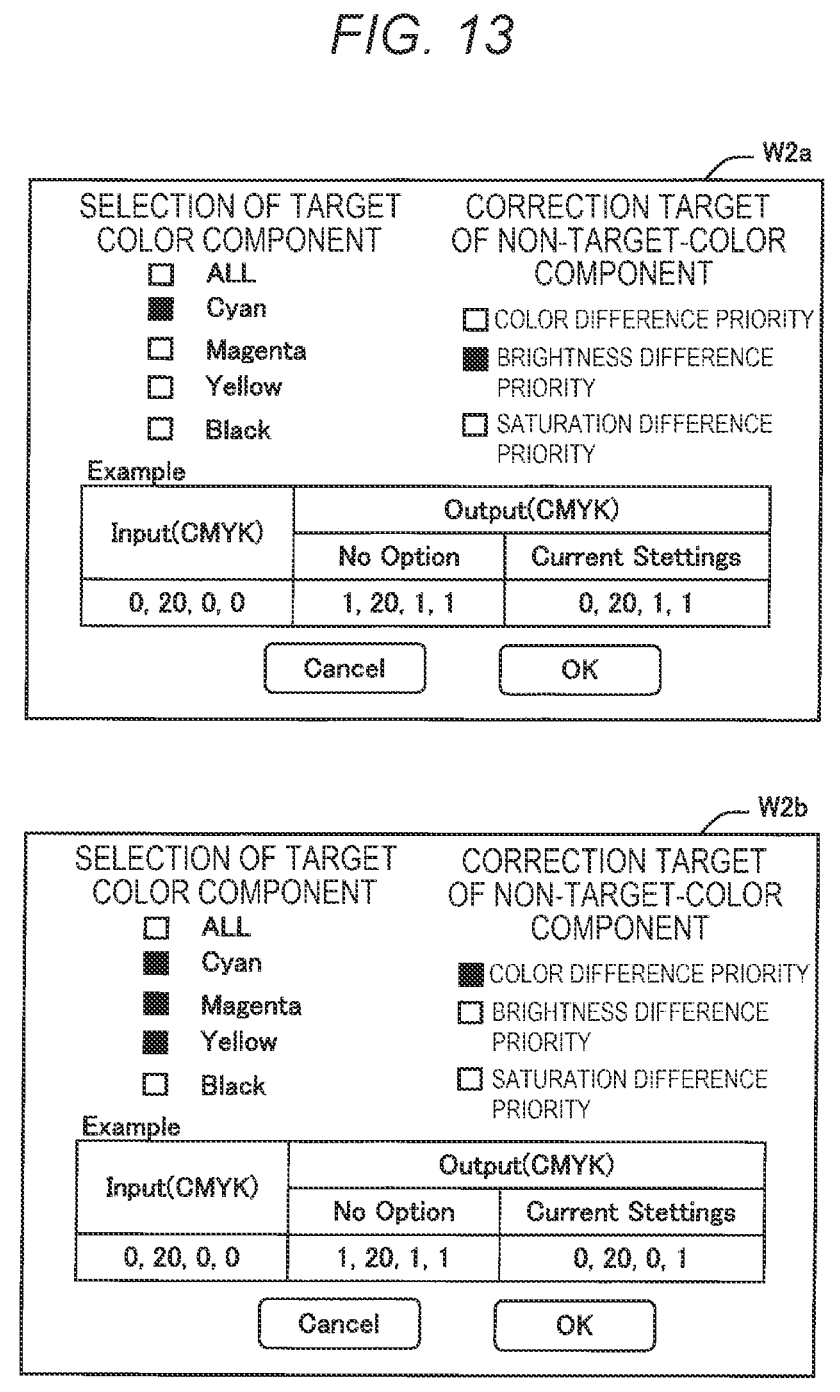

| Input(CMYK) | Output(CMYK) | |
|---|---|---|
| | No Option | Current Stettings |
| 0, 20, 0, 0 | 1, 20, 1, 1 | 0, 20, 1, 1 |

| Input(CMYK) | Output(CMYK) | |
|---|---|---|
| | No Option | Current Stettings |
| 0, 20, 0, 0 | 1, 20, 1, 1 | 0, 20, 0, 1 |

FIG. 15

<NON-INPUT-COLOR SUPPRESSION + NON-TARGET-COLOR COMPONENT CORRECTION: TARGET COLOR COMPONENT = ALL CMYK>

| | INPUT VALUE | | | | | OUTPUT VALUE | | | | | CORRECTED OUTPUT VALUE | | | |
|---|---|---|---|---|---|---|---|---|---|---|---|---|---|---|
| | C | M | Y | K | | C | M | Y | K | | C | M | Y | K |
| PRIMARY COLOR | 80 | 0 | 0 | 0 | → | 78 | 2 | 2 | 0 | → | 80 | 1 | 1 | 0 |
| SECONDARY COLOR | 0 | 80 | 80 | 0 | → | 2 | 78 | 77 | 0 | → | 1 | 79 | 78 | 0 |
| TERTIARY COLOR | 20 | 20 | 20 | 0 | → | 18 | 18 | 18 | 4 | → | 19 | 19 | 19 | 2 |

<NON-INPUT-COLOR SUPPRESSION + NON-TARGET-COLOR COMPONENT CORRECTION: TARGET COLOR COMPONENT = CMY>

| | INPUT VALUE | | | | | OUTPUT VALUE | | | | | CORRECTED OUTPUT VALUE | | | |
|---|---|---|---|---|---|---|---|---|---|---|---|---|---|---|
| | C | M | Y | K | | C | M | Y | K | | C | M | Y | K |
| PRIMARY COLOR | 80 | 0 | 0 | 0 | → | 78 | 2 | 2 | 0 | → | 80 | 1 | 1 | 0 |
| SECONDARY COLOR | 0 | 80 | 80 | 0 | → | 2 | 78 | 77 | 0 | → | 1 | 79 | 78 | 0 |
| TERTIARY COLOR | 20 | 20 | 20 | 0 | → | 18 | 18 | 18 | 4 | → | 18 | 18 | 18 | 4 |

<NON-INPUT-COLOR SUPPRESSION + NON-TARGET-COLOR COMPONENT CORRECTION: TARGET COLOR COMPONENT = C>

| | INPUT VALUE | | | | | OUTPUT VALUE | | | | | CORRECTED OUTPUT VALUE | | | |
|---|---|---|---|---|---|---|---|---|---|---|---|---|---|---|
| | C | M | Y | K | | C | M | Y | K | | C | M | Y | K |
| PRIMARY COLOR | 80 | 0 | 0 | 0 | → | 78 | 2 | 2 | 0 | → | 78 | 2 | 2 | 0 |
| SECONDARY COLOR | 0 | 80 | 80 | 0 | → | 2 | 78 | 77 | 0 | → | 1 | 79 | 78 | 0 |
| TERTIARY COLOR | 20 | 20 | 20 | 0 | → | 18 | 18 | 18 | 4 | → | 18 | 18 | 18 | 4 |

○ : NON-INPUT-COLOR SUPPRESSION k1=0.5, Dmax=3[%]

□ : NON-TARGET-COLOR COMPONENT CORRECTION

〈Cyan removal〉
C
M
Y
White
CRPc
VD3
VD1
VD2
SCRc
P12
P11
SPc
〈View from VD1〉
P12(10,80,80)
P11(0,80,80)
〈View from VD2〉
〈View from VD3〉
P11(0,80,80)
P12(10,80,80)

C_max = min{(m+y), C_lim} t = Xj_in / Xj_max

Xj_max = min{( Σ Xi − Xj), Xj_lim}

FIG. 19

<NON-INPUT-COLOR REMOVAL + NON-TARGET-COLOR COMPONENT CORRECTION + SPREADING CORRECTION: TARGET COLOR COMPONENT = C>

| | INPUT VALUE | | | | OUTPUT VALUE | | | | CORRECTED OUTPUT VALUE | | |
|---|---|---|---|---|---|---|---|---|---|---|---|
| | C | M | Y | | C | M | Y | | C | M | Y |
| P11 | 0 | 80 | 80 | → | 2 | 78 | 77 | → | 0 | 79 | 78 |
| P12 | 10 | 80 | 80 | → | 12 | 79 | 78 | → | 10 | 80 | 79 |

○ : NON-INPUT-COLOR REMOVAL
□ : NON-TARGET-COLOR COMPONENT CORRECTION
■ : SPREADING CORRECTION

FIG. 21

<NON-INPUT-COLOR REMOVAL + NON-TARGET-COLOR COMPONENT CORRECTION + SPREADING CORRECTION: TARGET COLOR COMPONENT = CY>

| | INPUT VALUE | | | | OUTPUT VALUE | | | | CORRECTED OUTPUT VALUE | | |
|---|---|---|---|---|---|---|---|---|---|---|---|
| | C | M | Y | | C | M | Y | | C | M | Y |
| P31 | 0 | 0 | 90 | → | 4 | 4 | 86 | → | 0 | 6 | 88 |
| P32 | 10 | 0 | 90 | → | 16 | 4 | 86 | → | 12 | 6 | 88 |
| P33 | 0 | 90 | 0 | → | 4 | 86 | 4 | → | 0 | 94 | 0 |
| P34 | 10 | 90 | 0 | → | 16 | 86 | 4 | → | 12 | 94 | 0 |
| P35 | 0 | 90 | 10 | → | 4 | 86 | 16 | → | 0 | 94 | 12 |
| P36 | 10 | 90 | 10 | → | 16 | 86 | 16 | → | 12 | 94 | 12 |

○ : NON-INPUT-COLOR REMOVAL

□ : NON-TARGET-COLOR COMPONENT CORRECTION

■ : SPREADING CORRECTION

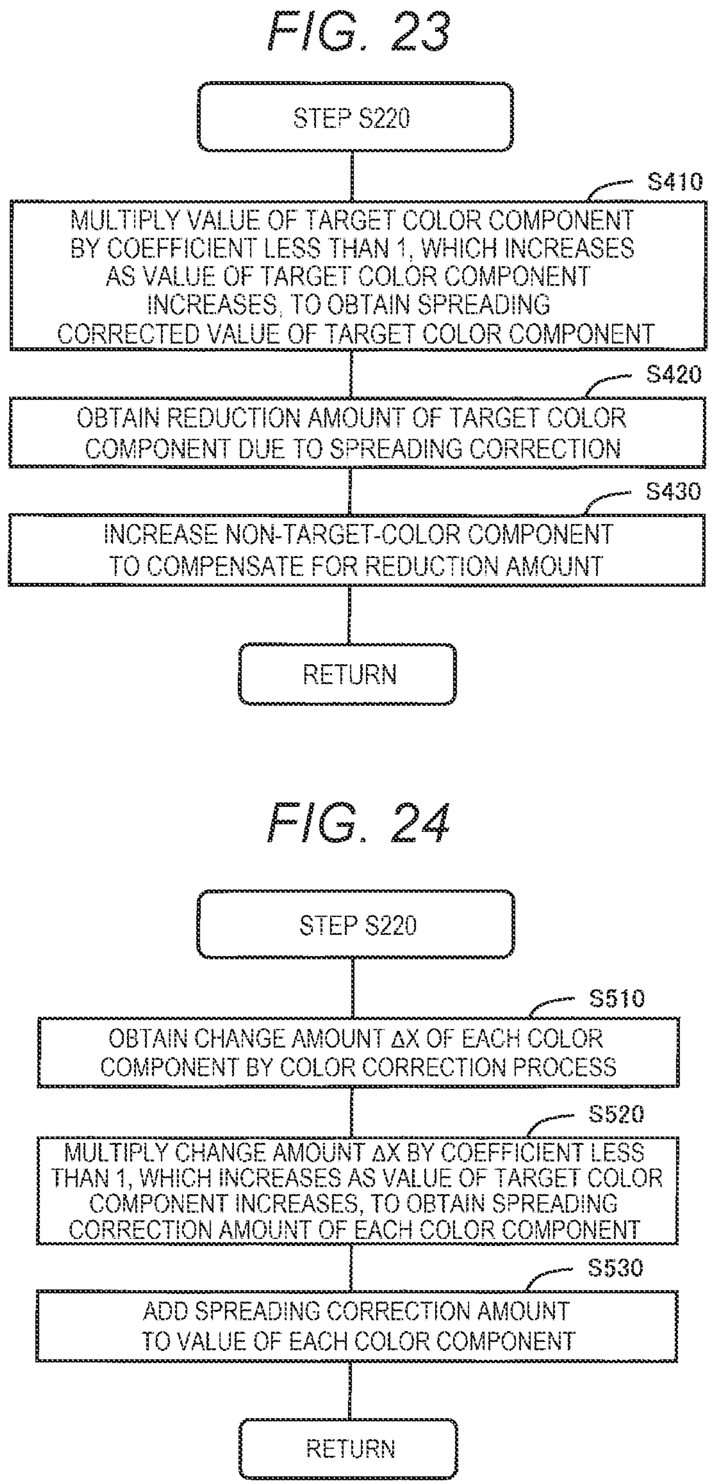
FIG. 23
STEP S220
S410
MULTIPLY VALUE OF TARGET COLOR COMPONENT BY COEFFICIENT LESS THAN 1, WHICH INCREASES AS VALUE OF TARGET COLOR COMPONENT INCREASES, TO OBTAIN SPREADING CORRECTED VALUE OF TARGET COLOR COMPONENT
S420
OBTAIN REDUCTION AMOUNT OF TARGET COLOR COMPONENT DUE TO SPREADING CORRECTION
S430
INCREASE NON-TARGET-COLOR COMPONENT TO COMPENSATE FOR REDUCTION AMOUNT
RETURN
FIG. 24
STEP S220
S510
OBTAIN CHANGE AMOUNT ΔX OF EACH COLOR COMPONENT BY COLOR CORRECTION PROCESS
S520
MULTIPLY CHANGE AMOUNT ΔX BY COEFFICIENT LESS THAN 1, WHICH INCREASES AS VALUE OF TARGET COLOR COMPONENT INCREASES, TO OBTAIN SPREADING CORRECTION AMOUNT OF EACH COLOR COMPONENT
S530
ADD SPREADING CORRECTION AMOUNT TO VALUE OF EACH COLOR COMPONENT
RETURN F2(t) = (1−Dc/Do)×F1(t) + (Dc/Do)

FIG. 27

<NON-INPUT-COLOR SUPPRESSION + NON-TARGET-COLOR COMPONENT CORRECTION + SPREADING CORRECTION: TARGET COLOR COMPONENT = CY>

| | INPUT VALUE | | | | OUTPUT VALUE | | | | CORRECTED OUTPUT VALUE | | |
|---|---|---|---|---|---|---|---|---|---|---|---|
| | C | M | Y | | C | M | Y | | C | M | Y |
| P31 | 0 | 0 | 90 | → | 4 | 4 | 86 | → | 2 | 5 | 87 |
| P32 | 10 | 0 | 90 | → | 16 | 4 | 86 | → | 14 | 5 | 87 |
| P33 | 0 | 90 | 0 | → | 4 | 86 | 4 | → | 2 | 90 | 2 |
| P34 | 10 | 90 | 0 | → | 16 | 86 | 4 | → | 14 | 90 | 2 |
| P35 | 0 | 90 | 10 | → | 4 | 86 | 16 | → | 2 | 90 | 14 |
| P36 | 10 | 90 | 10 | → | 16 | 86 | 16 | → | 14 | 90 | 14 |

○ : NON-INPUT-COLOR SUPPRESSION k1=0.5, Dmax=3[%]

□ : NON-TARGET-COLOR COMPONENT CORRECTION

■ : SPREADING CORRECTION

COLOR CORRECTION DEVICE, PRINTING SYSTEM, COLOR CORRECTION METHOD, AND NON-TRANSITORY COMPUTER-READABLE STORAGE MEDIUM STORING PROGRAM

The present application is based on, and claims priority from JP Application Serial Number 2023-068309, filed Apr. 19, 2023, the disclosure of which is hereby incorporated by reference herein in its entirety.

BACKGROUND

1. Technical Field

The present disclosure relates to a color correction device, a printing system, a color correction method, and a non-transitory computer-readable storage medium storing a program.

2. Related Art

In a typical printing device, printing is executed using four kinds of color materials, C (cyan), M (magenta), Y (yellow), and K (black). When the printing is performed, a color conversion for converting an input value in an input color space into an output value in an output color space is executed in a printing data generation device such as a personal computer. In the color conversion, a color component that is not present in the input value may appear in the output value. For example, when a patch formed of only a cyan color material is printed, even when the input value includes only a C component such as CMYK (90, 0, 0, 0), the output value may include an M component or a Y component such as CMYK (89, 1, 2, 0). Here, "CMYK (90, 0, 0, 0)" means C=90%, M=0, Y=0, and K=0. When the color component that is not present in the input value appears in the output value as described above, color turbidity and graininess may be perceived. In order to avoid such turbidity and graininess, a technique of "pure color protection" or "ink protection" is known in the related art in which, when an input color represented by the input value is a single color of any one of C, M, Y, and K, an output color represented by the output value is also made a single color.

JP-A-2018-082360 discloses an image processing device that performs a color purification process. The image processing device corrects, when an input color that is a primary color or a secondary color is multicolored by a color conversion, an output color to a primary color or a secondary color by performing the color purification process. The output color is corrected to reduce a color difference between the input color and the output color. The process of the primary color in the related art corresponds to the "pure color protection".

JP-A-2018-082360 is an example of the related art.

However, in the related art, sufficient consideration may not be given to how to select an output value correction target in order to reduce color turbidity and graininess. In the related art, there is a problem that a color may be excessively changed due to correction of an output value.

SUMMARY

According to a first aspect of the present disclosure, a color correction device is provided. A color correction device includes: a color conversion unit configured to convert an input value in an input color space into an output value in an output color space; a selection unit configured to receive a selection, as a target color component, of one or more color components among a plurality of color components used in a printing device; and a correction unit configured to execute a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component among the plurality of color components.

According to a second aspect of the present disclosure, a printing system including a color correction device and a printing device is provided. The color correction device includes a color conversion unit configured to convert an input value in an input color space into an output value in an output color space, a selection unit configured to receive a selection, as a target color component, of one or more color components among a plurality of color components used in the printing device, a correction unit configured to execute a first correction process of correcting, when the input value is a first type input value representing a color not including the target color component, a first type output value corresponding to the first type input value in a manner of reducing the target color component, and a printing data generation unit configured to generate printing data to be supplied to the printing device using a corrected output value corrected by the correction unit. The first correction process includes non-target-color component correction of reducing a color difference between before and after correction by correcting an output value component corresponding to a non-target-color component that is a color component other than the target color component among the plurality of color components.

According to a third aspect of the present disclosure, a color correction method is provided. The color correction method includes: (a) converting an input value in an input color space into an output value in an output color space; (b) receiving a selection, as a target color component, of one or more color components among a plurality of color components used in a printing device; and (c) executing a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component among the plurality of color components.

According to a fourth aspect of the present disclosure, a non-transitory computer-readable storage medium storing a program is provided. The program causes a computer to execute: (a) a process of converting an input value in an input color space into an output value in an output color space; (b) a process of receiving a selection, as a target color component, of one or more color components among a plurality of color components used in a printing device; and (c) a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component among plurality of color components.

BRIEF DESCRIPTION OF THE DRAWINGS

FIG. 7 is a diagram showing a comparison between pure color protection in the related art and the non-input-color removal in the present disclosure.

FIG. 8 is a diagram showing an example of selecting a target color component in a first embodiment.

FIG. 9 is a diagram showing an example of a color correction process in the first embodiment.

FIG. 13 is a diagram showing an example of selecting a target color component in a second embodiment.

FIG. 15 is a diagram showing an example of a color correction process including non-input-color suppression in a third embodiment.

FIG. 19 is a diagram showing a processing example including spreading correction when the C component is set as the target color component.

FIG. 21 is a diagram showing a processing example including spreading correction when the CY components are set as the target color components.

FIG. 23 is a flowchart showing a processing procedure of step S220 in the fourth embodiment.

FIG. 24 is a flowchart showing a processing procedure of step S220 in a fifth embodiment.

FIG. 27 is a diagram showing an example of a color correction process in the seventh embodiment.

DESCRIPTION OF EMBODIMENTS

A. First Embodiment

Configuration of Device

Figure 1:
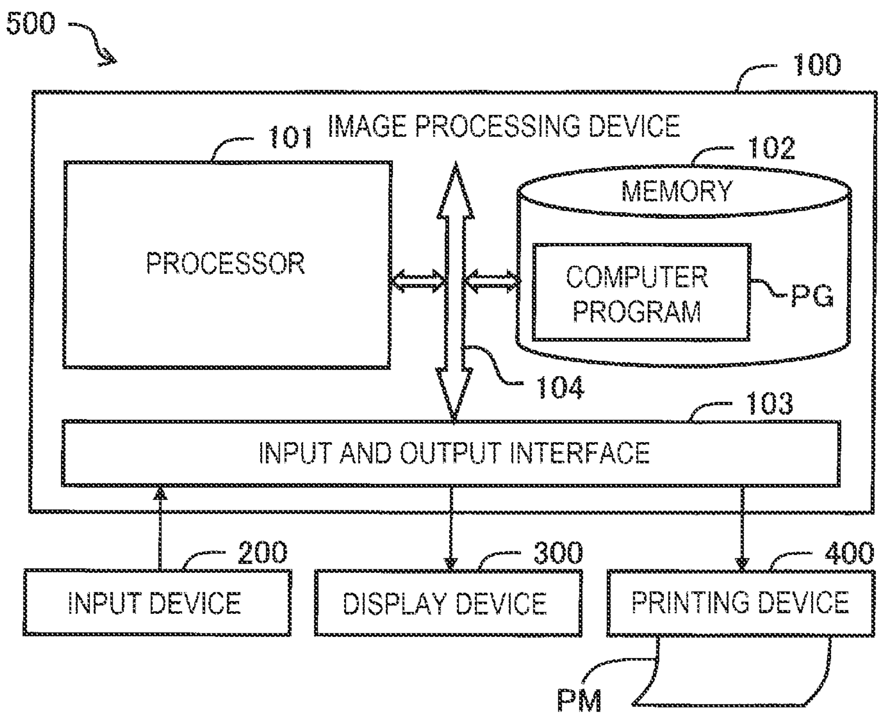
FIG. 1 is a diagram showing a configuration of a printing system.

FIG. 1 is a diagram showing a configuration of a printing system 500 according to an embodiment. The printing system 500 includes an image processing device 100, an input device 200, a display device 300, and a printing device 400. The image processing device 100 corresponds to a "color correction device" in the present disclosure.

The image processing device 100 includes a processor 101, a memory 102, an input and output interface 103, and an internal bus 104. The processor 101, the memory 102, and the input and output interface 103 are coupled via the internal bus 104 so as to be able to communicate in both directions. The memory 102 includes a volatile memory including a main memory and a video memory, and a nonvolatile memory such as a hard disk and a solid state drive (SSD). The input device 200, the display device 300, and the printing device 400 are coupled to the input and output interface 103 of the image processing device 100 by wired communication or wireless communication. The input device 200 is, for example, a keyboard or a mouse. The display device 300 is, for example, a liquid crystal display. The input device 200 and the display device 300 may be integrated as a touch panel. The printing device 400 is, for example, an inkjet printer, and prints an image on a printing medium PM using a plurality of kinds of ink. The printing device 400 may be implemented as a digital textile printing machine that prints an image on a fabric printing medium PM.

Figure 2:
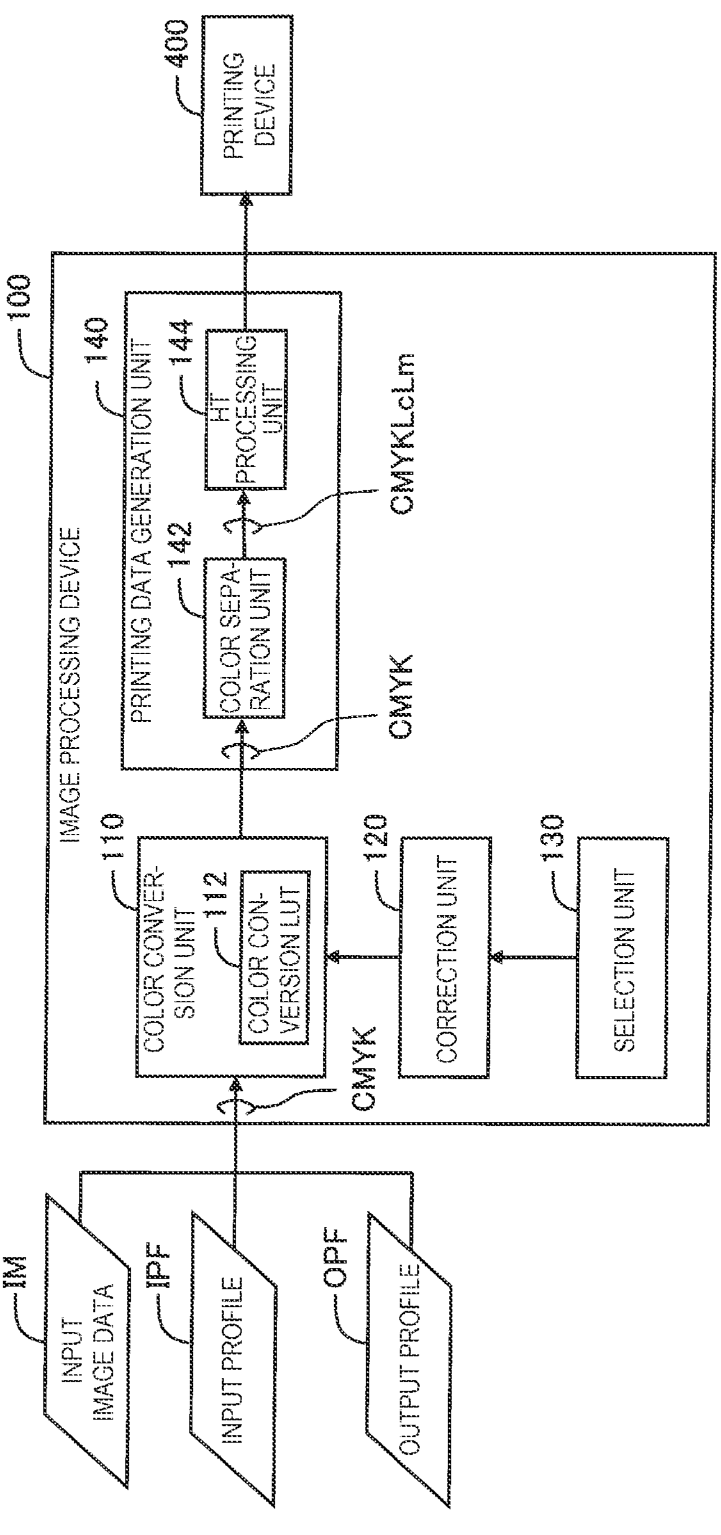
FIG. 2 is a diagram showing an example of a configuration of an image processing device.

FIG. 2 is a diagram showing an example of a configuration of the image processing device 100. The image processing device 100 includes a color conversion unit 110, a correction unit 120, a selection unit 130, and a printing data generation unit 140. Functions of these units are implemented by software by the processor 101 executing a computer program PG stored in advance in the memory 102. Some of the functions of the units may be implemented by hardware circuits.

The color conversion unit 110 uses a color conversion lookup table 112 to execute a color conversion process of converting an input value in an input color space into an output value in an output color space. The color conversion lookup table 112 is created by combining an input profile IPF and an output profile OPF. The input profile IPF is an ICC profile used for a color conversion from the input color space used in input image data IM to a device-independent color space. The input color space is, for example, an RGB color space or a CMYK color space. The device-independent color space is, for example, a CIE-$L^*a^*b^*$ color space or a CIE-XYZ color space. The output profile OPF is an ICC profile used for a color conversion from the device-independent color space to the output color space for the printing device 400. As the output color space, various color spaces such as a CMYK color space and a CMYKRG color space can be used. The "CMYKRG color space" is a color space including six color components, C (cyan), M (magenta), Y (yellow), K (black), R (red), and G (green). A color in the output color space is also referred to as a "device color". In the example in FIG. 2, both the input color space and the output color space are CMYK color spaces.

The correction unit 120 executes a color correction process to be described later. The color correction process includes a process of correcting, when an input value represents a color not including a target color component, an output value in a manner of reducing the target color component. The selection unit 130 receives a selection of a user related to the target color component that is a target of color correction. As the target color component, for example, one or more color components are selected from a plurality of color components CMYK in the device color.

The printing data generation unit 140 uses a corrected output value corrected by the correction unit 120 to generate printing data to be supplied to the printing device 400. The printing data generation unit 140 includes a color separation unit 142 and a halftone processing unit 144. The color separation unit 142 converts an output value of each pixel of the input image data IM converted by the color conversion unit 110 into density values of a plurality of color materials of the printing device 400. In the example in FIG. 2, the printing device 400 uses color materials Lc (light cyan) and Lm (light magenta) in addition to CMYK, and the color separation unit 142 converts output values CMYK of each pixel into density values of six color materials CMYKLCLm. The halftone processing unit 144 generates printing data by performing a halftone process using a density value of each pixel after color separation. The printing device 400 executes printing according to the printing data transmitted from the printing data generation unit 140.

Figure 3:
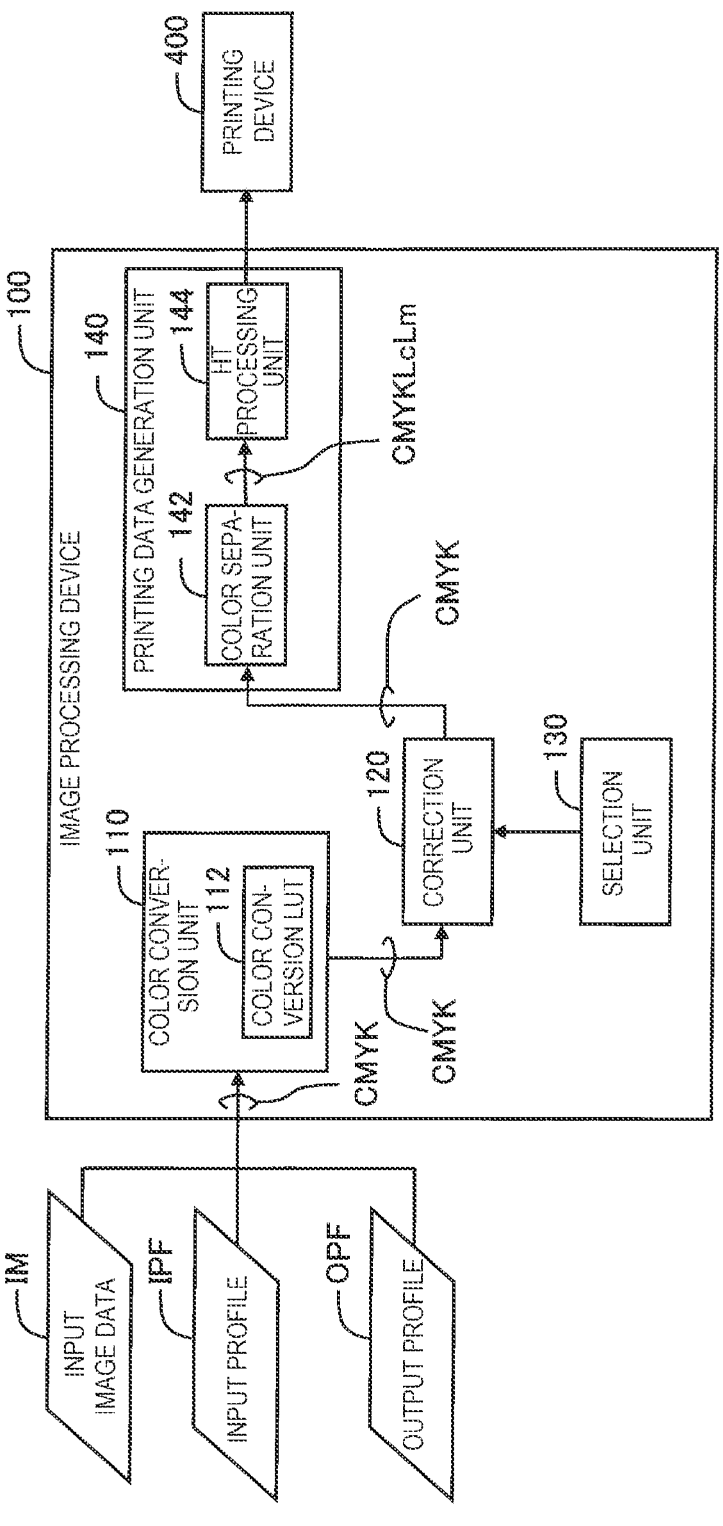
FIG. 3 is a diagram showing another example of the configuration of the image processing device.

FIG. 3 is a diagram showing another example of the configuration of the image processing device 100. In this example, the correction unit 120 corrects the output values CMYK converted by the color conversion unit 110, and transmits the corrected output values to the printing data generation unit 140. In this case as well, one or more color components among the plurality of color components CMYK in the device color can be selected as the target color component that is the target of the color correction.

Figure 4:
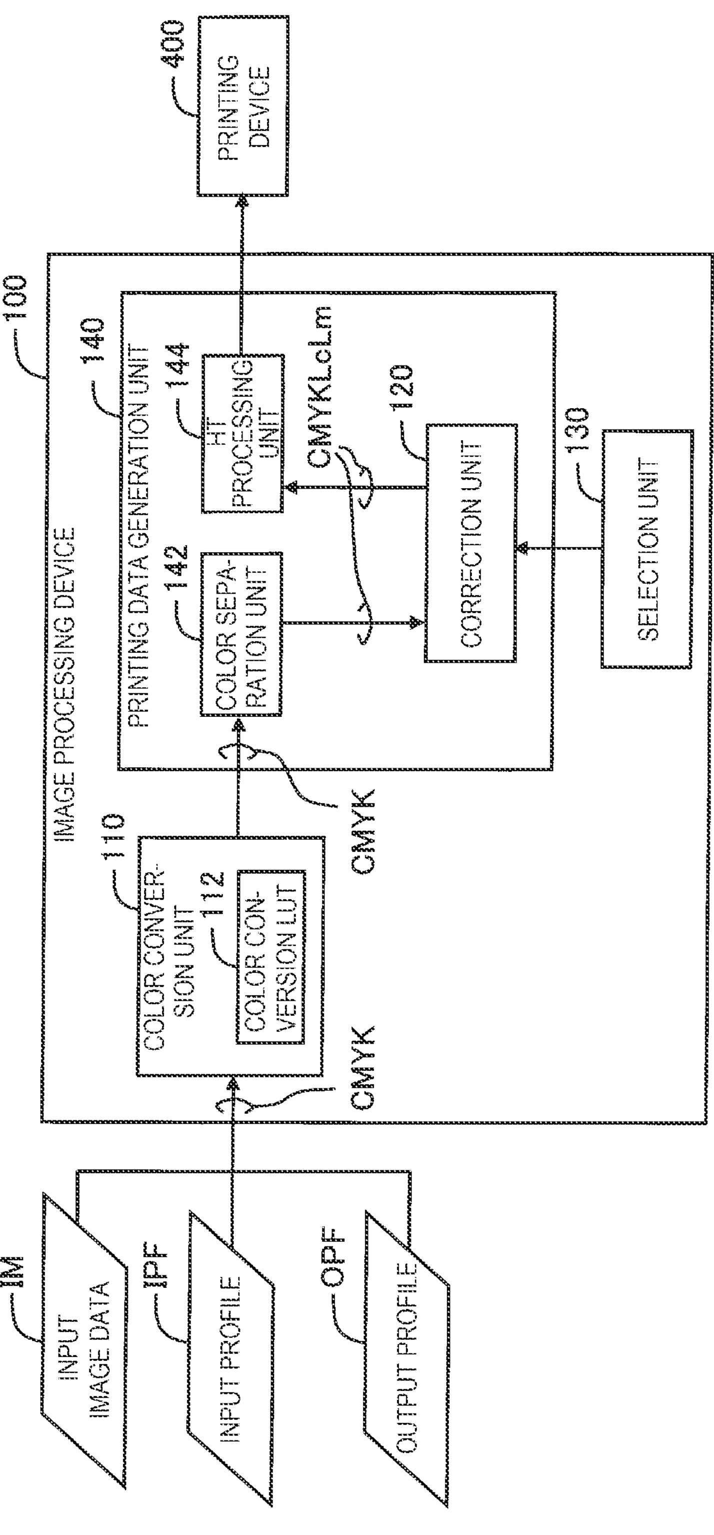
FIG. 4 is a diagram showing still another example of the configuration of the image processing device.

FIG. 4 is a diagram showing still another example of the configuration of the image processing device 100. In this example, the correction unit 120 corrects the density values of the color materials CMYKLcLm converted by the color separation unit 142, and transmits the corrected density values to the halftone processing unit 144. In this case, the density values of the color materials CMYKLCLm correspond to "output values after color conversion". One or more color materials among the six color materials CMYKLcLm can be selected as the target color component that is the target of the color correction.

When the target color component is an Lc component, the Lc component that is not present in the input color space CMYK. In this case, as a method for determining a value of the target color component Lc in the input value CMYK, any one of the following two methods can be used.

1. First Method

A first method is a method for considering that the target color component Lc is not in the input value CMYK when a value of a C component in the input value CMYK is 0 or equal to or greater than a threshold value, and for considering that the target color component Lc is in the input value CMYK when the value of the C component in the input value CMYK is a positive value less than the threshold value. As the threshold value, for example, a value of 15% to 25% can be used.

2. Second Method

A second method is a method for considering the value of the target color component Lc in the input value CMYK as 0 regardless of actual values of the input values CMYK.

The selection unit 130 may be configured to receive from the user a selection of which of these methods to use.

As can be understood from the examples in FIGS. 2 to 4, as a "plurality of color components used in the printing device" selectable as the target color component, a plurality of color components of the device color may be used, or a plurality of color components corresponding to a plurality of color materials in the printing device may be used. In the following description, a case where the color component of the device color is selected as the target color component mainly using the configuration described in FIG. 2 will be described.

Definition of Terms

Input color: a color represented by an input value of color conversion.

Output color: a color represented by an output value of color conversion.

Pure color protection: a process of correcting an output value of color conversion when an input value includes only color components of primary colors such as C, M, and Y to only color components of the same primary colors as the input value, which is a type of color correction in the related art.

C protection: pure color protection of cyan.

Non-input-color removal: a type of color correction according to the present disclosure, and a color component that is not present in a color represented by an input value is removed from an output value.

C removal: non-input-color removal of cyan.

Color removal plane: a plane defined by an input value in which one target color component is 0.

Non-input-color suppression: one type of color correction according to the present disclosure, in which a color component that is not present in a color represented by an input value is reduced from an output value.

Target color component: a color component selected as a target of non-input-color removal or non-input-color suppression.

Non-target-color component: a color component to which non-input-color removal or non-input-color suppression is not applied.

Primary color: a color including one color component among CMY components in subtractive color mixing, and a color including one color component among RGB components in additive color mixing.

Secondary color: a color including two color components.

Tertiary color: a color including three color components.

Pure K: black represented only by K and represented by CMYK (0, 0, 0, k).

Composite K: black represented only by CMY components and represented by CMYK (c, m, y, 0).

Rich K: black represented by using all CMYK components and represented by CMYK (c, m, y, k).

In the present disclosure, a range of each color component is 0 to 100%. White and black are represented as follows, for example.

CMYK (0, 0, 0, 0): white

CMYK (100, 100, 100, 100): black

RGB (0, 0, 0): black

RGB (100, 100, 100): white

Content of Color Correction Process

Figure 5:
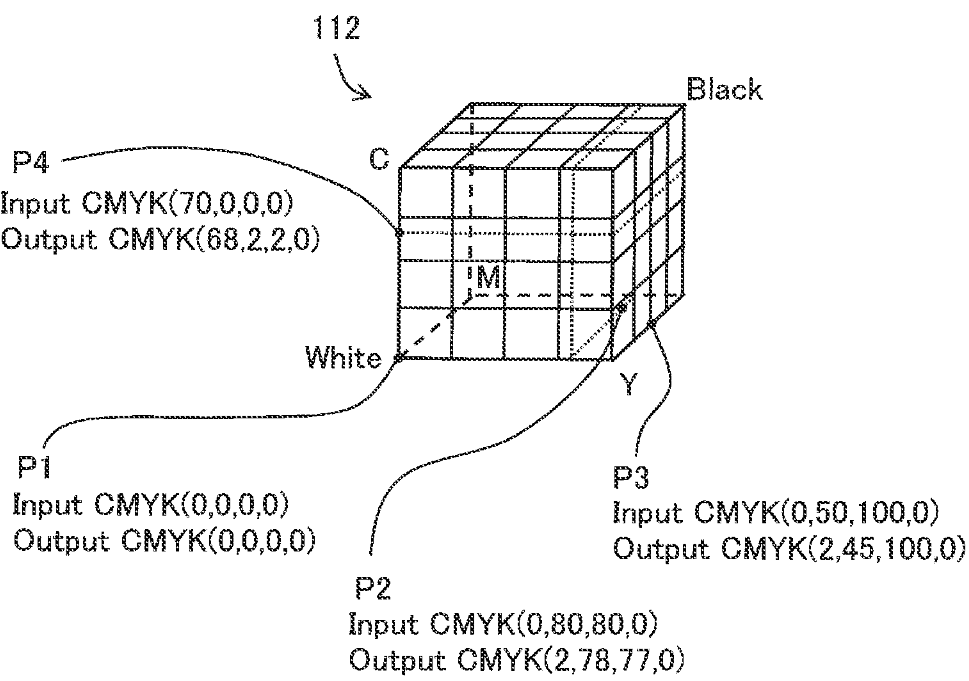
FIG. 5 is a diagram showing an example of a color conversion lookup table.

FIG. 5 is a diagram showing an example of the color conversion lookup table 112. Here, it is assumed that both the input color space and the output color space are CMYK. In FIG. 5, it is assumed that K=0, and a three-dimensional color solid including three color components CMY of the input value is drawn. An origin of the color solid is white (paper white), and is defined by three coordinate axes of a C-axis, an M-axis, and a Y-axis orthogonal to each other. A plurality of grid points are set in the color solid. In FIG. 5, only main grid lines and grid points are drawn for convenience of illustration. Each of the plurality of grid points of the color solid represents an input color. The color conversion lookup table 112 is a table in which output values are registered for input values corresponding to coordinate values of each grid point. In this example, for four grid points P1 to P4, input values CMYK (0, 0, 0, 0), CMYK (0, 80, 80, 0), CMYK (0, 50, 100, 0), and CMYK (70, 0, 0, 0), and output values CMYK (0, 0, 0, 0), CMYK (2, 78, 77, 0), CMYK (2, 45, 100, 0), and CMYK (68, 2, 2, 0) corresponding thereto are shown. The input value and the output value of the color conversion represent the same color in a device-independent color space such as the CIE-L*a*b* color space or the CIE-XYZ color space, but a color component that is not present in the input value may appear in the output value. In this case, color turbidity and graininess may occur in an image reproduced by the output value.

Figure 6:
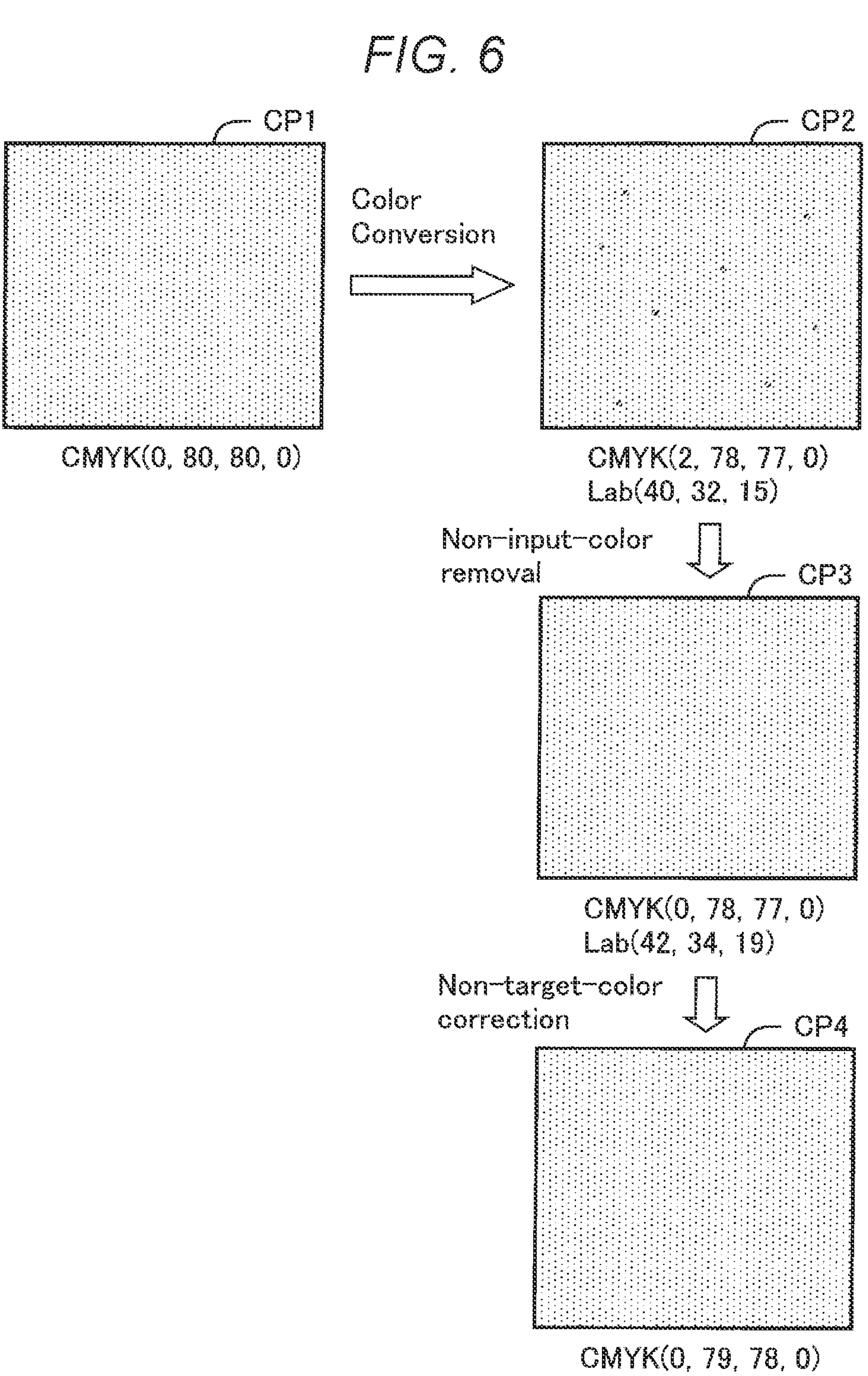
FIG. 6 is a diagram showing an example of occurrence of graininess due to a color conversion and non-input-color removal.

FIG. 6 is a diagram showing an example of generation of graininess and non-input-color removal by color conversion. In this example, a first color patch CP1 represented by the input value CMYK (0, 80, 80, 0) of the grid point P2 in FIG. 5 and a second color patch CP2 reproduced by the output values CMYK (2, 78, 77, 0) after the color conversion are drawn. Lab values corresponding to the output values CMYK are described below the output values CMYK of the second color patch CP2. The Lab values means L*a*b* values of a CIE-L*a*b* color system. The first color patch CP1 includes substantially uniform secondary colors of magenta and yellow. Meanwhile, in the second color patch CP2, since the output value includes 2% of the C component, cyan ink dots are sparsely formed. In the second color patch CP2, since a color material for a color component that is not present in the input value is mixed, color turbidity and graininess may be perceived.

In particular, when the printing medium PM is a cloth, color turbidity becomes a major problem. For example, when the printing medium PM made of cloth is used to create printed matters such as point of purchase advertising (POP), a poster, and apparel, a printed image is required to be uniform and smooth, and thus color turbidity in an image region having a uniform color becomes a problem. Therefore, when the printing medium PM made of cloth is used, it is particularly desirable to prevent occurrence of color turbidity.

The non-input-color removal, which is a type of color correction according to the present disclosure, is a process of removing, from an output value, a target color component that is not in a color represented by an input value. When the C component is selected as the target color component and the non-input-color removal is applied to the output value CMYK (2, 78, 77, 0), the C component not in the input value CMYK (0, 80, 80, 0) is removed from the output value, and a corrected output value CMYK (0, 78, 77, 0) is obtained. A color patch CP3 reproduced by the corrected output value CMYK (0, 78, 77, 0) is reproduced by substantially uniform secondary colors of magenta and yellow, and thus no color turbidity or graininess occurs. As described later, the non-input-color removal can also be applied to a primary color or a multi-order color, which is a tertiary color or higher-order color.

Referring to the Lab values described below the output values CMYK of the color patches CP2 and CP3, it can be understood that Lab values (40, 32, 15) before non-input removal and Lab values (42, 34, 19) after the non-input removal are considerably different. In this example, since the C component is reduced by the non-input-color removal, brightness is shifted to a brighter side and saturation is shifted to a higher side. Therefore, in the embodiment, non-target-color component correction for reducing a color difference between before and after the color correction is executed by correcting a non-target-color component that is a color component to which non-input-color removal is not applied. The non-target-color component correction is, for example, correction for increasing the non-target-color component in a manner of compensating for a change amount of a target color component due to the non-input-color removal. A color component in which an input value is 0 may be excluded from a target of the non-target-color component correction. In other words, the target of the non-target-color component correction may be a color component in which the input value is not 0 among color components to which the non-input-color removal is not applied. In this way, color turbidity and graininess can be further prevented.

In an example in FIG. 6, a corrected output value CMYK (0, 79, 78, 0) of a fourth color patch CP4 is a result obtained by correcting an M component and a Y component, which are non-target-color components in the output value CMYK (0, 78, 77, 0) after the non-input removal in a manner of compensating for a change amount of the C component due to the non-input removal. That is, since the C component is reduced by 2% by the non-input-color removal, the M component and the Y component are respectively increased by 18, thereby compensating for a reduction amount of the C component. The Lab values reproduced by the corrected output values CMYK (0, 79, 78, 0) are (41, 35, 20), and a change in brightness due to the color correction can be reduced. As the color difference to be reduced in the non-target-color component correction, a color difference or a saturation difference may be used instead of a brightness difference. A specific correction method for the non-target-color component correction will be further described later. Processing contents of the non-input-color removal and the non-target-color component correction will be sequentially described below.

FIG. 7 is a diagram showing a comparison between pure color protection in the related art and the non-input-color removal in the present disclosure. Here, C protection is shown as an example of the pure color protection in the related art. The input color as a target of the C protection is a color of a grid point on the C-axis indicated by a thick line in an upper left diagram in FIG. 7. The C protection is correction for converting an output value at a grid point of the input values CMYK (c, 0, 0, 0) to CMYK (c', 0, 0, 0).

FIG. 7 further shows target regions of C removal, M removal, and Y removal as the non-input-color removal according to the present disclosure. The non-input-color removal is performed on an input color of a grid point group that is present at a surface of the color solid. In the case of the C removal, a grid point group in which the C component in the input value is 0 is a target, and a hatched MY surface is a target of the non-input-color removal. The MY surface is referred to as a “color removal plane CRPC”. The color removal plane CRPc is a plane defined by an input value having the C component of 0. In the example in FIG. 6 described above, when the C removal is applied to the output values CMYK (2, 78, 77, 0), the C component not in the input values CMYK (0, 80, 80, 0) is removed from output values, and the corrected output values CMYK (0, 78, 77, 0) are obtained. The same applies to the M removal and the Y removal. That is, in the M removal, a CY plane becomes a color removal plane CRPm that is a target region of the non-input-color removal, and in the Y removal, a CM plane becomes a color removal plane CRPy that is a target region of the non-input-color removal. The CMYK color space is a four-dimensional color space, and for example, the color removal plane CRPc in which the C component in the input values is 0 constitutes a hyperplane of the four-dimensional space. Since it is difficult to show such a hyperplane, the hyperplane is represented by a plane of a three-dimensional space in FIG. 7.

In the present disclosure, the user can freely select a target color component that is a target of the non-input-color removal. For example, when the M removal and the Y removal are used in combination, the M component and the Y component are removed from an output value of the grid point on the C-axis, and only the C component remains.

When the user freely selects the target color component that is the target of the non-input-color removal, it is possible to reduce color turbidity and graininess which are problematic. For example, for the purpose of reducing the color turbidity y as described above with reference to FIG. 6, when a cause of the turbidity is cyan, a sufficient effect can be obtained by performing C removal. In this case, it is not necessary to select all of CMYK as target color components, and only the C component may be selected as the target color component.

It is also possible to apply K removal in which the target color component in non-input-color removal is K (black). For example, when input values CMYK (20, 20, 20, 0) are converted into output values CMYK (18, 18, 18, 2) by color conversion, the corrected output values CMYK (18, 18, 18, 0) can be obtained by applying the K removal. In this example, the input values CMYK (20, 20, 20, 0) are the composite K, but the output values CMYK (18, 18, 18, 2) are the mixed rich K for K. When the K removal is applied to this example, the corrected output values CMYK (18, 18, 18, 0) become the composite K. As a result, by not using K ink, it is possible to express uniform solid gray without graininess. In this example, the non-input-color removal is applied to the tertiary color. When input values CMYK (80, 80, 80, 0) are converted into output values CMYK (30, 30, 30, 60), and when the K removal is applied, the corrected output values become CMYK (30, 30, 30, 0), and a failure occurs in which gray is completely different in density. Therefore, in such a case, it is preferable not to select a K component as the target color component.

FIG. 8 is a diagram showing an example of selecting a target color component in a first embodiment. The selection unit 130 causes the user to select a target color component by displaying a selection window on the display device 300. In a first selection window W1*a*, cyan is selected as the target color component. This means that only the C component is selected as the target color component. In a lower part of the selection window W1*a*, an input value and an output value of a processing example are shown. "No Option" is an example of the output value when non-input-color removal is not applied. "Current Settings" is an example of a corrected output value when non-input-color removal is applied to a selected target color component. In the processing example of the selection window W1*a*, the C component is corrected to 0 by applying the non-input-color removal. In a second selection window W1*b*, cyan, magenta, and yellow are selected as the target color components. In a processing example of the selection window W1*b*, non-input-color removal is applied to the C component and the Y component to correct the C component and the Y component to 0. The processing example may be omitted.

The non-input-color removal in the present disclosure is also applicable to a case where a color material used in the printing device 400 is other than CMYK. For example, it is assumed that the printing device 400 executes printing using six color materials, C (cyan), M (magenta), Y (yellow), K (black), R (red), and G (green). In this case, any one or more of the six color components CMYKRG can be selected as the target color component for the non-input-color removal. Specifically, when input values CMYKRG (10, 10, 10, 10, 0, 0) are converted into output values CMYKRG (10, 10, 10, 10, 2, 2) by color conversion, and when two or more color components including an R component and a G component are selected as the target color components, the output values can be corrected to CMYKRG (10, 10, 10, 10, 0, 0).

Generally, when N is an integer of 3 or more, it is preferable that the selection unit 130 is configured to receive a selection, as the target color components, of any one or more and N or less color components among N color components corresponding to N color materials used in the printing device 400. In particular, it is preferable that three or more color components can be freely selected as the target color components. In this way, the color correction process can be executed for a desired number of target color components from one to N.

FIG. 9 is a diagram showing an example of the color correction process including non-input-color removal and non-target-color component correction. Here, processing results are shown for three cases of a case where "ALL" is selected as the target color components, a case where three color components, "CMY", are selected as the target color components, and a case where only "C" is selected as the target color component. When the input color is the primary color, the secondary color, and the tertiary color, a processing result thereof is shown. The "corrected output value" is an output value after the non-input-color removal. In the "corrected output value", a number surrounded by a circle is a value of a color component changed by the non-input-color removal, and a number surrounded by a double frame is a value of a color component changed by the non-target-color component correction. As can be understood from this example, by the user selecting the target color component, the non-input-color removal can be executed for any color component.

In the uppermost example in FIG. 9, the M component and the Y component in the input value are 0, the non-input-color removal is applied to the M component and the Y component, and the non-target-color component correction is applied to the C component. The C component is selected as the target color component in the non-input-color removal, but the C component in the input value is not 0 and the non-input removal is not applied, so that the C component is the target of the non-target-color component correction. The K component is a color component to which the non-input-color removal is not applied, but is excluded from the target of the non-target-color component correction because a value of the K component in the input value is 0. The K component may be the target of non-target-color component correction. These processing contents are similar to that in the other examples in FIG. 9. As described above, the non-target-color component correction can be applied to the color component to which the non-input-color removal is not applied, and is particularly preferably applied to the color component in which a value of the input value is not 0.

The non-target-color component correction can be executed, for example, according to the following formula.

$$Ej^* = Ej + \sum \Delta i/m \tag{q1}$$

Here, Ej is a value of each non-target-color component before the non-target-color component correction, Ej* is a value of each non-target-color component after the non-target-color component correction, Δi is a reduction amount of each target color component due to the non-input-color removal, ΣΔi is a sum of reduction amounts of target color components due to the non-input-color removal, and m is the number of non-target-color components. With respect to a division result ΣΔi/m of a second term on a right side of the formula (q1), a rounding process such as rounding off, rounding down, and rounding up may be applied to a digit after a decimal point.

The sum ΣΔi of the reduction amounts of the target color components means that, when non-input-color removal is applied to a plurality of target color components, a sum of the reduction amounts is taken. For example, in the uppermost example in FIG. 9, the sum ΣΔi of the reduction amounts of the target color components due to the non-input-color removal is 4%, and the number m of non-target-color components is 1. Therefore, in the non-target-color component correction, 4% is added to the C component that is the non-target-color component. The non-target-color component correction using the formula (q1) is an example of a process of calculating a correction amount ΣΔi/m of the non-target-color component in the non-target-color component correction according to the reduction amount ΣΔi of the target color component due to the non-input-color removal. The non-target-color component correction corresponds to a process of increasing the non-target-color component and compensating for a change amount −ΣΔi of the target color component due to the non-input-color removal. In the example in FIG. 9, the non-target-color component correction is executed by using the formula (q1), and the rounding off is applied to a digit after a decimal point in the division result ΣΔi/m.

The non-target-color component correction may be executed according to the following formula.

$$Ej^* = Ej + \sum (wi \times \Delta i)/(wj \times m) \tag{q2}$$

Here, wi is a weight for each color component, and wj is a weight for each non-target-color component. With respect to a division result of a second term on a right side, a rounding process such as rounding off, rounding down, and rounding up may be applied to a digit after a decimal point. The non-target-color component correction is a process of calculating a weighted sum Σ(wi×Δi) of the reduction amounts Δi of one or more target color components and distributing the sum Σ(wi×Δi) according to the weight wj of each non-target-color component, thereby calculating a correction amount Σ(wi×Δi)/(wj×m) for each non-target-color component.

The non-target-color component correction using the formula (q2) is also another example of a process of calculating a correction amount Σ(wi×Δi)/(wj×m) of the non-target-color component in the non-target-color component correction according to the reduction amount Σ(wi×Δi) of the target color component due to the non-input-color removal. The non-target-color component correction also corresponds to a process of increasing the non-target-color component and compensating for a change amount of the target color component due to the non-input-color removal.

The weight wi of each color component can be set in consideration of brightness of each color component. A weight of the multi-order color component is preferably a value larger than a weight of the primary color component. For example, a weight wi of the CMY component may be set to 1.0, and a weight wi of the K component may be set to 3.0. In this case, for example, when 1% of the K component is removed by the K removal, the non-target-color component correction is performed so that each of the CMY components increases by 18. As described above, when the correction amount Σ(wi×ΔTi)/(wj×m) is calculated according to the weight wi of each color component, the brightness can be more appropriately adjusted by the non-target-color component correction.

The non-target-color component correction may be further executed according to the following formula.

$$Ej^* = Ej \times kj \tag{q3}$$

Here, kj is a correction coefficient exceeding 1. The correction coefficient kj may be a different value for each color component, or may be a constant value regardless of the color component. With respect to a division result on a right side, a rounding process such as rounding off, rounding down, and rounding up may be applied to a digit after a decimal point. The correction coefficient kj is preferably set to a value that increases as the reduction amount of the target color component due to the non-input-color removal increases. Since it is important whether a result of the non-target-color component correction according to the formula (q3) matches preference of the user, it is preferable that the correction unit 120 is configured to receive an adjustment of the correction coefficient kj by the user.

In the example in FIG. 9, the non-target-color component correction is performed according to the above formula (q1). In FIG. 9, both the input color space and the output color space are CMYK color spaces, but the color correction according to the present disclosure is also applicable to a case of using other color spaces such as the CMYK color space, the CMYKRG color space, and the RGB color space.

When the input color space is RGB and the output color space is CMYK, values of CMY components in the input values can be considered as equal to CMY values obtained by converting input values RGB by the following conversion formula.

$$Ci = (1 - Ri) \tag{q4}$$

$$Mi = (1 - Gi) \tag{q5}$$

$$Yi = (1 - Bi) \tag{q6}$$

Here, Ri, Gi, and Bi are color components in the input values, and Ci, Mi, and Yi are CMY components corresponding to RGB components in the input value. Ri, Gi, Bi, and Ci, Mi, Yi are values in a range of 0 to 1, and the value "1" corresponds to 100%.

A value of the K component in the input values RGB can be determined by any of the following methods.

1. Method M1*a:*

A value Ki of the K component in the input value RGB is determined according to the following formula.

$$Ki=\min(Ci, Mi, Yi) \tag{q7}$$

2. Method M1*b:*

The K component is considered as 0 regardless of an actual value of the input values RGB.

The selection unit 130 may be configured to receive a selection of one of the methods M1*a* and M1*b* from the user.

Whether an input color represented by the input values Ri, Gi, and Bi corresponds to the primary color, the secondary color, or the tertiary color is also determined by the Ci, Mi, and Yi components. That is, when only one of the Ci, Mi, and Yi components obtained by converting any input values Ri, Gi, and Bi by the formulas (q4) to (q6) is not 0 and the other two color components are 0, the input color represented by the input values is the "primary color". When only two color components of the Ci, Mi, and Yi components are not 0 and the other one color component is 0, the input color is the "secondary color". When none of the Ci, Mi, and Yi components is 0, the input color is the "tertiary color". As described above, even when the input color space is RGB, non-input-color removal can be executed on various input colors from the primary color to the tertiary color.

When the input color space is CMYK and the output color space is RGB, values of CMY components corresponding to output values can be considered as equal to CMY values obtained by converting the output values RGB by the following conversion formula.

$$Co=(1-Ro) \tag{q8}$$

$$Mo=(1-Go) \tag{q9}$$

$$Yo=(1-Bo) \tag{q10}$$

Here, Ro, Go, and Bo are color components in the output values, and Co, Mo, and Yo are CMY components corresponding to RGB components in the output values. Ro, Go, Bo and Co, Mo, Yo are values in the range of 0 to 1, and the value "1" corresponds to 100%.

A value of the K component in the output values RGB can be determined by any of the following methods.

1. Method M2*a:*

A value Ko of the K component in the output value RGB is determined according to the following formula.

$$Ko=\min(Co, Mo, Yo) \tag{q11}$$

2. Method M2*b:*

The K component is considered as 0 regardless of an actual value of the output values RGB.

The selection unit 130 may be configured to receive a selection of one of the methods M2*a* and M2*b* from the user.

The color components in the output values RGB corresponding to the CMY components in which values of the input values CMYK are 0 and values Co, Mo, and Yo obtained by the formulas (q8) to (q10) are not 0 are corrected to 100% by the non-input-color removal. The correction substantially corresponds to correcting the values of the CMY components selected as the target color component to zero. As can be understood from this example, correction of increasing an R component in the output values RGB corresponds to correction of reducing the C component that is the target color component. Similarly, correction of increasing a G component the output values RGB corresponds to correction of reducing the M component that is the target color component, and correction of increasing a B component in the output values RGB corresponds to correction of reducing the Y component that is the target color component.

Processing Procedure

Figure 10:
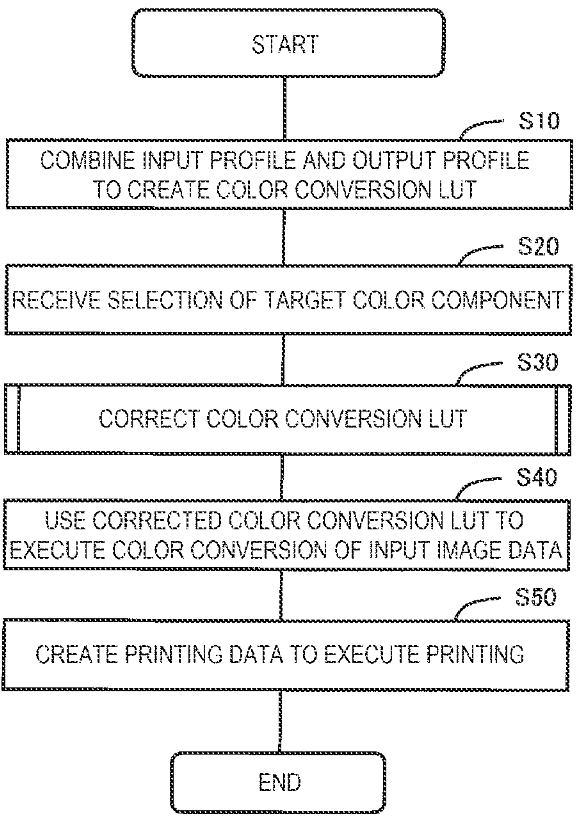
FIG. 10 is a flowchart showing an overall procedure of a color correction process.

FIG. 10 is a flowchart showing an overall procedure of the color correction process. In step S10, the color conversion unit 110 combines the input profile IPF and the output profile OPF to create the color conversion lookup table 112. In step S20, the selection unit 130 receives, from the user, a selection of the target color component that is the target of the color correction. The target color component is selected using, for example, the selection window shown in FIG. 8. In step S30, the correction unit 120 corrects contents of the color conversion lookup table 112.

Figures 11, 12:
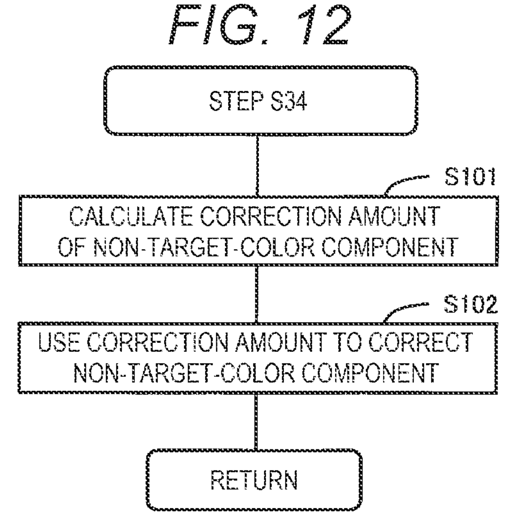
FIG. 11 is a 1 showing a processing procedure of step S30 in the first embodiment.
FIG. 12 is a flowchart showing a processing procedure of step S34 in the first embodiment.

FIG. 11 is a flowchart showing a processing procedure of step S30 in the first embodiment. Here, it is assumed that the input color space is CMYK.

In step S31, the correction unit 120 selects one grid point of the color conversion lookup table 112. This process corresponds to a process of converting an input value in the input color space into an output value in the output color space. In step S32, the correction unit 120 determines whether the target color component in the input values CMYK of the selected grid point is 0. When the target color component is not 0 in the input values CMYK, the process proceeds to step S35 to be described later. Meanwhile, when the target color component in the input values CMYK is 0, the process proceeds to step S33, and the correction unit 120 corrects the target color component in output values. That is, the target color component in the output values is corrected to 0 by applying the non-input-color removal. In step S34, the correction unit 120 corrects the non-target-color component in the output values.

FIG. 12 is a flowchart showing a processing procedure of step S34 in the first embodiment. In step S101, the correction unit 120 calculates a correction amount of the non-target-color component. In the embodiment, the correction amount $\Sigma\Delta i/m$ is calculated by performing the non-target-color component correction according to the above formula (q1). In step S102, the correction unit 120 uses the correction amount to correct the non-target-color component. When the non-target-color component correction ends, the correction unit 120 updates an output value of the color conversion lookup table 112 with a corrected output value, and proceeds to step S35 in FIG. 11.

In step S35, the correction unit 120 determines whether the processes of steps S31 to S34 are completed for all grid points of the color conversion lookup table 112. When there is a grid point that is not processed, the process returns to step S31, and the processes of steps S31 to S34 are executed again. When the process is completed for all the grid points, the process of step S30 ends, and the process proceeds to step S40.

In step S40, the color conversion unit 110 uses the corrected color conversion lookup table 112 to execute a color conversion of the input image data IM. In step S50, the printing data generation unit 140 uses the color-converted image data to create printing data, and transfers the printing data to the printing device 400 to execute printing.

In the processing procedures in FIGS. 10 and 11 described above, the color correction is executed for the grid points of the color conversion lookup table 112, but instead, as shown in FIGS. 3 and 4, the color correction may be executed for an output of the color conversion unit 110 or an output of the color separation unit 142. When color correction is executed on the grid points of the color conversion lookup table 112, an appropriate color conversion can be executed on a large number of pieces of input image data using the corrected color conversion lookup table 112. When color correction is executed for the grid points of the color conversion lookup table 112, there is no need to perform color correction for each pixel of the input image data, so there is an advantage that a processing speed is faster.

According to the first embodiment described above, when the target color component is not in the color represented by the input value, the target color component in the output value is removed, and thus it is possible to prevent occurrence of color turbidity and graininess. Since one or more target color components can be selected, a correction process can be executed for a desired number of target color components. By performing non-target-color component correction, it is possible to prevent colors from being excessively different due to the color correction process.

B. Second Embodiment

FIG. 13 is a diagram showing an example of selecting a target color component in a second embodiment. In the second embodiment, a user can select a correction target of a non-target-color component. That is, in selection windows W2*a* and W2*b*, in addition to the contents of the selection windows W1*a* and W1*b* shown in FIG. 8, options of the correction target of the non-target-color component are displayed. Three options are shown as examples, which are "color difference priority", "brightness difference priority", and "saturation difference priority". The "color difference priority" means that the non-target-color component correction is executed so that a color difference between before and after color correction becomes small. Similarly, "brightness difference priority" means that non-target-color component correction is executed so that a brightness difference between before and after color correction becomes small, and "saturation difference priority" means that non-target-color component correction is executed so that a saturation difference between before and after color correction becomes small. In the first selection window W2*a*, "brightness difference priority" is selected. In the second selection window W2*b*, "color difference priority" is selected. In the following description, the "brightness difference" and the "color difference" that are index values of selected option are referred to as "corrected target values".

Figure 14:
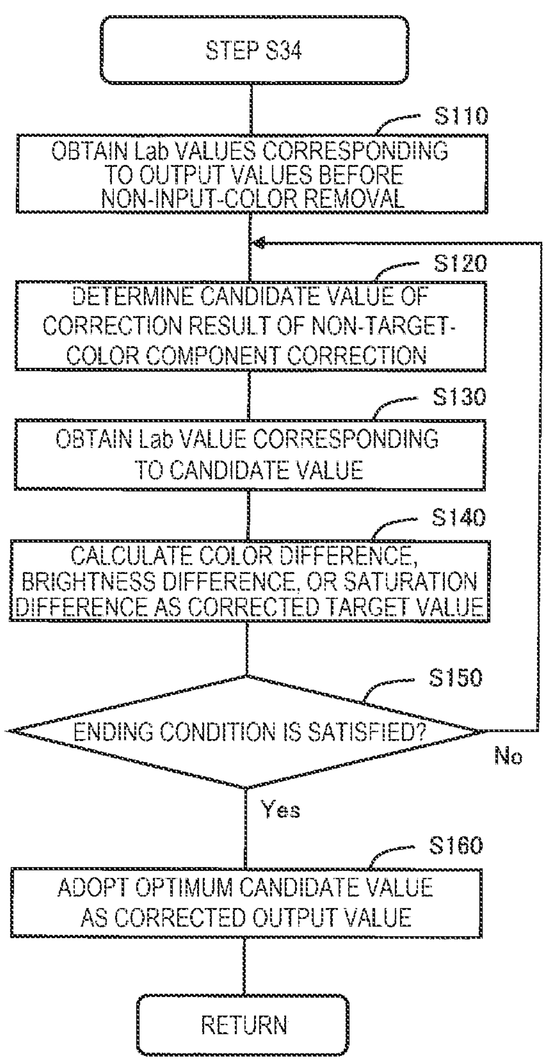
FIG. 14 is a flowchart showing a processing procedure of step S34 in the second embodiment.

FIG. 14 is a flowchart showing a processing procedure of step S34 in the second embodiment. A device configuration shown in FIGS. 1 and 2 is the same as that of the first embodiment. The processing procedures shown in FIGS. 10 and 11 are also the same as those in the first embodiment. The processing procedure in FIG. 14 is obtained by changing a detailed procedure of the non-target-color component correction in step S34 in FIG. 11. In the second embodiment, the non-target-color component correction is executed so that the corrected target values before and after the color correction process become small.

In step S110, the correction unit 120 obtains Lab values corresponding to output values before non-input-color removal. The process of step S110 can be executed by an inverse conversion using the output profile OPF. In step S120, the correction unit 120 determines a candidate value of a correction result of the non-target-color component correction. An initial value of the candidate value may be any value. In step S130, the correction unit 120 obtains a Lab value corresponding to the candidate value. This processing can also be executed by the inverse conversion using the output profile OPF. In step S140, the correction unit 120 calculates a corrected target value based on the Lab values obtained in step S110 and the Lab value obtained in step S130. As described above, as the corrected target value, one of the color difference, the brightness difference, and the saturation difference is selected by the user. In step S150, the correction unit 120 determines whether a preset ending condition is satisfied. As the ending condition, for example, a condition that the corrected target value is equal to or less than a preset allowable value can be used. Alternatively, a condition that the number of times of execution of the processes of steps S120 to S140 reaches a preset upper limit number of times or more may be used. When the ending condition is not satisfied, the process returns to step S120, and the processes of steps S120 to S150 are executed again. At this time, in step S120, a next candidate value is searched for. The search for the candidate value may be executed using an optimization algorithm. When the ending condition is satisfied, the process proceeds to step S160, and the correction unit 120 adopts an optimum candidate value as the corrected output value. As the "optimum candidate value", for example, the smallest corrected target value is selected from among a plurality of candidate values.

The second embodiment has a similar effect as the first embodiment. In the second embodiment, the user can select one of the color difference, the brightness difference, and the saturation difference as the corrected target value, and can execute non-target-color component correction so as to reduce the selected corrected target value.

C. Third Embodiment

In the first embodiment and the second embodiment described above, the non-input-color removal is executed on the target color component, but in a third embodiment, non-input-color suppression is executed instead of the non-input-color removal. The "non-input-color suppression" is color correction in which a target color component that is not present in a color represented by an input value is reduced from an output value. In the non-input-color suppression, it is preferable to reduce a value of the target color component and change the value to a corrected value that is not zero.

The corrected value of the target color component after the non-input-color suppression is calculated by the following formula, for example.

$$Dc = \min(k1 \times Do, D\max) \quad (q12)$$

Here, Dc is a corrected value of the target color component, Do is a value of the target color component before correction, min( ) is a function for selecting and outputting a smaller value, k1 is a positive coefficient less than 1, and Dmax is an upper limit value. The upper limit value Dmax is set in advance as a value at which color turbidity and graininess are not perceived. For a result of k1×Do, a rounding operation such as rounding up, rounding down, or rounding off to a digit after a decimal point may be applied. When rounding up is applied as the rounding operation, the corrected value Dc of the target color component can be a positive value other than 0.

For example, it is assumed that the target color component is CMY, input values of a color conversion are CMYK (0, 80, 80, 0), and output values are CMYK (2, 78, 77, 0). In this case, the non-input-color removal described in the first embodiment is applied, the corrected output value becomes CMYK (0, 78, 77, 0). Meanwhile, when the non-input-color suppression in which k1=0.5 and Dmax=3 [%] is applied, the corrected output values become CMYK (1, 78, 77, 0), and the C component is reduced to a value other than 0.

The upper limit value Dmax at which color turbidity and graininess are not perceived may be stored in the output profile OPF. Alternatively, the upper limit value Dmax may be acquired in association with the printing device 400, or may be set by a user. A manufacturer or a user of the printing device 400 can actually execute printing and set the upper limit value Dmax evaluated as no problem.

When the target color component is CMY and an output color space is RGB, the non-input-color suppression is a process of increasing RGB values corresponding to CMY as the target color components.

When the non-input-color suppression is applied, and when a target color component is not in an input color, by reducing the target color component in an output color, it is possible to obtain a printed matter with less color turbidity and graininess. When the non-input-color removal described in the first embodiment is applied, a color difference between the input color and the output color may increase. Meanwhile, when the non-input-color suppression is applied, the color difference between the input color and the output color can be reduced compared with the non-input-color removal.

FIG. 15 is a diagram showing an example of a color correction process according to the third embodiment. A device configuration shown in FIGS. 1 and 2 is the same as that of the first embodiment. The processing procedures shown in FIGS. 10 to 12 are also the same as those in the first embodiment. The example in FIG. 15 corresponds to a result of applying the non-input-color suppression according to the above formula (q12) instead of the non-input-color removal in the example shown in FIG. 9. In this example, k1=0.5 and Dmax=3 [%].

The following formula may be used instead of the above formula (q12).

$$Dc = k1 \times Do \qquad \text{(q13)}$$

When using the formula (q13) as well, it is possible to implement the non-input-color suppression in which a value of the target color component in output values is reduced.

Each of the above formulas (q12) and (q13) corresponds to a calculation for obtaining the corrected value Dc by multiplying the value Do of the target color component in the output values by the positive coefficient k1 less than 1. When the value of the target color component is corrected by such a calculation, it is possible to prevent occurrence of color turbidity and graininess, and it is possible to reduce a change in a color due to the correction of the output value.

According to the third embodiment, when the target color component is not in the color represented by the input value, the target color component in the output value is reduced, and thus it is possible to prevent occurrence of color turbidity and graininess, and it is possible to reduce a change in a color due to the correction of the output value.

D. Fourth Embodiment

In a fourth embodiment, the following terms are used.

Spreading correction: a type of a second correction process according to the present disclosure, and correction applied to an output value corresponding to an input value near an input value in which a target color component is zero.

Spreading correction range: a range to be subjected to the spreading correction in an input color space.

First type input value: an input value representing a color not including a target color component, in which an output value corresponding to the input value is a processing target of non-input-color removal or non-input-color suppression.

Second type input value: an input value to be subjected to the spreading correction.

In the first to third embodiments described above, the non-input-color removal or the non-input-color suppression and the non-target-color component correction are applied to the output value corresponding to the input value in which the target color component is zero. In the fourth embodiment, the spreading correction is applied to the output value corresponding to the input value within the spreading correction range, the spreading correction range spreading the change amount of the target color component due to the non-input-color removal or the non-input-color suppression. The spreading correction range is set to a range that is near an input value in which the target color component is zero and that includes an input value in which the target color component is not zero.

Figure 16:
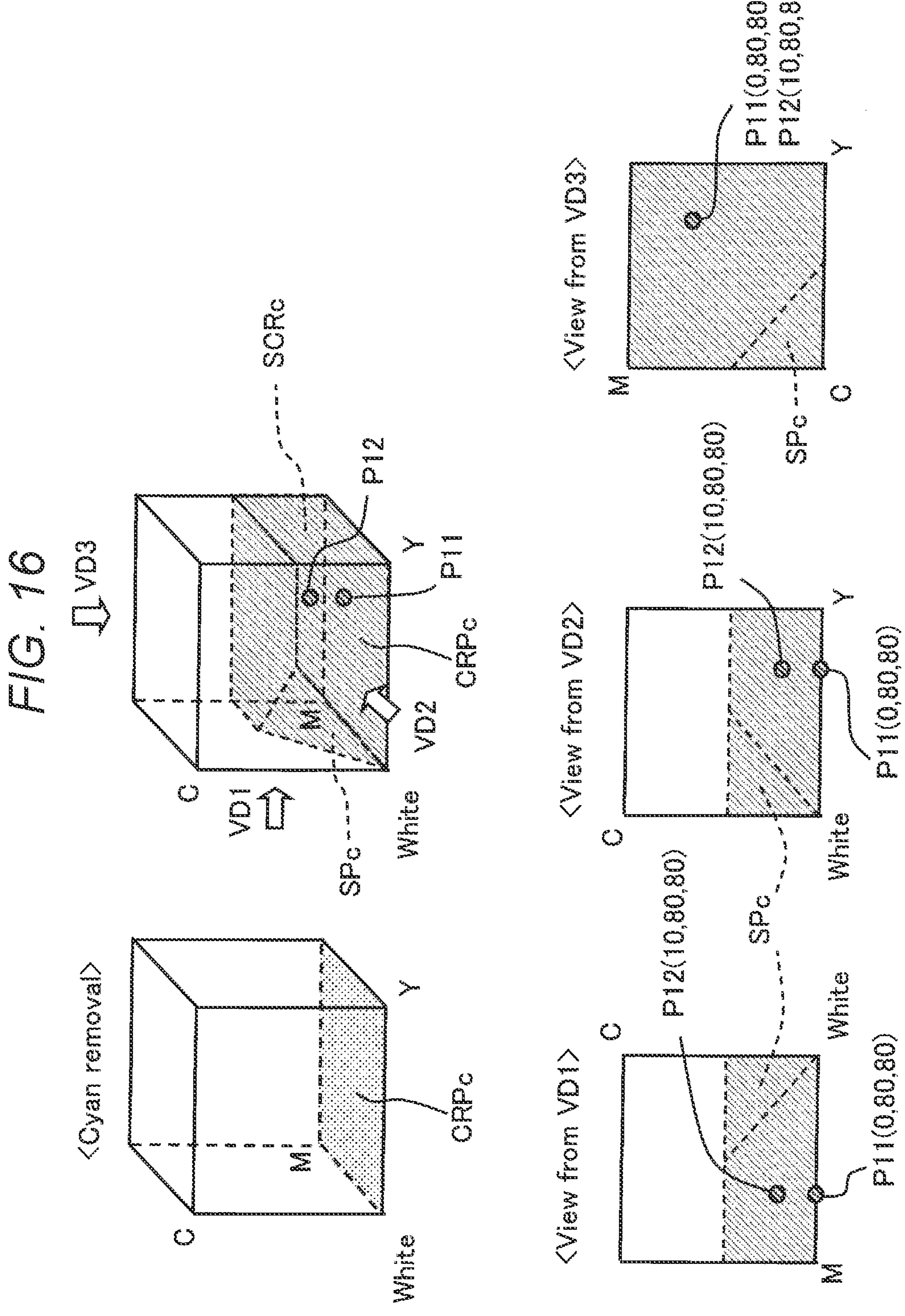
FIG. 16 is a diagram showing an example of a spreading correction range in a fourth embodiment.

FIG. 16 is a diagram showing a spreading correction range SCRc when the C component is set as the target color component. In FIG. 16, for simplicity, it is assumed that the input color space is a CMY color space. The same applies to examples of other spreading correction ranges to be described later.

The spreading correction range SCRc is a range in contact with the color removal plane CRPc in the input color space. The color removal plane CRPc is a plane in which the C component is 0. The spreading correction related to the C removal is executed on an output value obtained by color-converting an input value that is present in the spreading correction range SCRc. The non-input-color removal or the non-input-color suppression corresponds to a "first correction process" in the present disclosure. The spreading correction corresponds to the "second correction process" in the present disclosure. In the spreading correction range SCRc, two input points P11 and P12 are shown. Coordinates (c, m, y) of the input point P11 are (0, 80, 80), and the input point P11 is present on the color removal plane CRPc. Coordinates (c, m, y) of the input point P12 are (10, 80, 80), and the input point P12 is present within the spreading correction range SCRc. In a lower part of FIG. 16, the spreading correction range SCRc and the input points P11 and P12 when the input color space is respectively observed from three viewing directions VD1, VD2, and VD3, are drawn.

Figure 17:
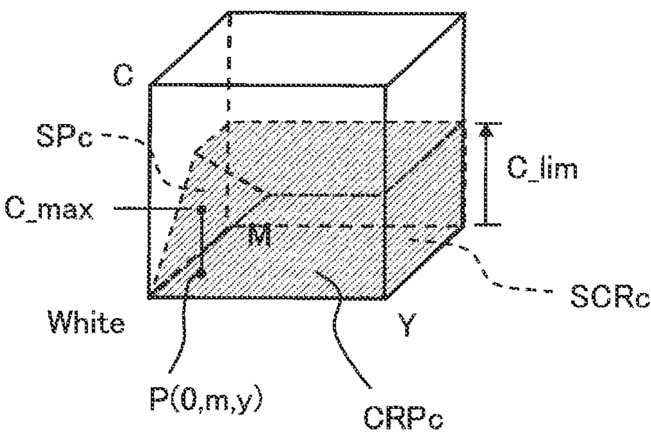
FIG. 17 is a diagram showing maximum coordinate values of the spreading correction range when a C component is set as a target color component.

FIG. 17 is a diagram showing a maximum coordinate value C_max of the spreading correction range SCRc when the C component is the target color component. The spreading correction range SCRc is set in a manner of extending to a position where a distance from the color removal plane CRPc becomes the maximum coordinate value C_max. The maximum coordinate value C_max is given by the following formula, for example.

$$C\_max = \min\{(m+y), C\_lim\} \quad (q14)$$

Here, C_max is a maximum value of a C coordinate value in the spreading correction range SCRc that is present directly above any grid position P (0, m, y) on the color removal plane CRPc, and C_lim is a preset limit value. The limit value C_lim is set to a value in a range of 20% to 50%, for example. In the embodiment, C_lim=50%.

As described above, the spreading correction range SCRc is preferably set according to a total value (m+y) of color components other than the target color component C in the input value. More specifically, the spreading correction range SCRc is preferably set in a manner of extending to a position where the distance from the color removal plane CRPc is equal to a smaller value of the total value (m+y) of the color components other than the target color component C in the input value and the preset limit value C_lim.

The spreading correction range SCRc has a shape obtained by cutting a part of a rectangular parallelepiped having the color removal plane CRPc as a bottom and the height C_lim from the bottom by an inclined surface SPc represented by c=m+y. A first reason for cutting a part of the rectangular parallelepiped by the inclined surface SPc is to skip the spreading correction near an origin by giving priority to a processing speed because values of the CMY components are small and an effect of the spreading correction is small near the origin of a color solid. A second reason is that when a plurality of spreading correction ranges overlap each other, contents of the spreading correction become complicated, thereby reducing a region where the spreading correction ranges overlap each other. The spreading correction range SCRc is not limited to such a shape, and may be set to any other shape. For example, a surface facing the color removal plane CRPC may be implemented only by the inclined surface SPc, or the inclined surface SPc may be omitted and the spreading correction range SCRc may be formed in a rectangular parallelepiped shape. When the spreading correction range SCRc having the shape as shown in FIG. 17 is used, it is possible to reduce the overlap with spreading correction range for other target color components, and it is possible to appropriately alleviate a color jump caused by the non-input-color removal.

The spreading correction is not applied to an output value corresponding to an input value that is present on the color removal plane CRPc, and is not applied to an output value corresponding to an input value at a position where the distance from the color removal plane CRPc is the maximum coordinate value C_max. For example, since the input point P11 is located on the color removal plane CRPC, the spreading correction is not applied to an output value corresponding to the input point P11, and the non-input removal is applied. Meanwhile, since the input point P12 is located not on the color removal plane CRPc but within the spreading correction range SCRc, the spreading correction is applied to the output value corresponding to the input point P12.

In FIGS. 16 and 17 described above, both the input color space and the output color space are CMY color spaces, but the spreading correction can also be applied when using another color space such as the CMYK color space, the CMYKRG color space, or the RGB color space.

When n is an integer of 3 or more, and when the input color space and the output color space each include n color components X1 to Xn, the spreading correction range related to the target color component Xj can be defined as a range that extends to a position where the distance from the color removal plane where the target color component Xj is 0 is equal to a maximum coordinate value Xj_max given by the following formula.

$$Xj\_max = \min\{(\sum Xi - Xj), Xj\_lim\} \quad (q15)$$

Here, Xj_max is a maximum value of Xj coordinate values in the spreading correction range that is present directly above any position on the color removal plane where the target color component Xj is 0, ΣXi is a sum of all the color components X1 to Xn in the input value, Xj is a target color component in the input value, and Xj_lim is a preset limit value. The limit value Xj_lim is set to a value in the range of 20% to 50%, for example. The formula (q15) is a generalized formula of the above-described formula (q14).

As shown in the above formula (q15), the spreading correction range is preferably set according to the total value (ΣXi−Xj) of the color components other than the target color component Xj in the input value. More specifically, the spreading correction range is preferably set in a manner of extending to a position where the distance from the color removal plane is equal to a smaller value of the total value (ΣXi−Xj) of the color components other than the target color component Xj in the input value and the preset limit value Xj_lim.

The spreading correction related to the target color component Xj can be executed, for example, according to the following formula.

$$Xj\_out^* = Xj\_out \times F1(t) \quad (q16)$$

$$t = Xj\_in/Xj\_max \quad 17)$$

Here, Xj_out is a value of the target color component in an output value before the spreading correction, Xj_out* is a value of the target color component after the spreading correction, Xj_in is a value of the target color component in the input value, and F1(t) is a correction coefficient having t as a parameter.

Figure 18:
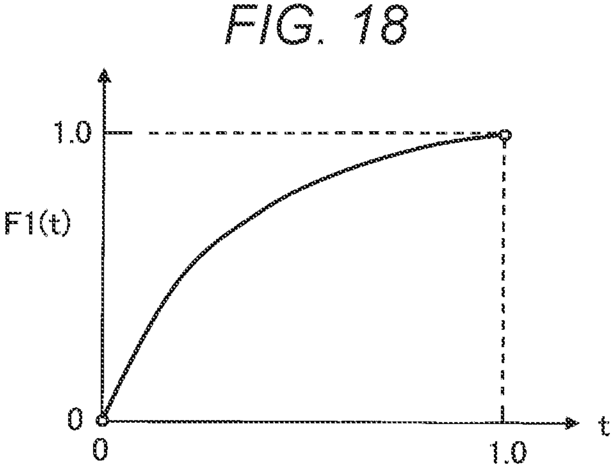
FIG. 18 is a diagram showing an example of a correction coefficient for spreading correction.

FIG. 18 is a diagram showing an example of the correction coefficient F1(t) for spreading correction. The correction coefficient F1(t) is a coefficient less than 1 that increases as the value Xj_in of the target color component in the input value increases. In the examples in FIGS. 16 and 17, with respect to any input value that is present inside the spreading correction range SCRc, the correction coefficient F1(t) decreases as the input value is closer to the color removal plane CRPC. F1(0)=0 and F1(1)=1. Since a point t=0 is on the color removal plane CRPc, the point is not subject to the spreading correction. Since a point t=1 corresponds to a position where the distance from the color removal plane CRPc is the maximum coordinate value C_max (=Xj_max), the point is not subject to the spreading correction. By applying the spreading correction using the correction coefficient F1(t), it is possible to prevent a large jump from appearing in a color represented by the corrected output value after the color correction.

In the example in FIG. 18, the correction coefficient F1(t) indicates a characteristic of an upwardly convex curve, but may indicate a characteristic of downwardly convex curve, or may indicate a characteristic of a straight line. When the correction coefficient F1(t) has the characteristic of an upwardly convex curve, it is preferable in that the color jump is more difficult to visually recognize.

It is also possible to execute the spreading correction according to the following formula instead of the above formula (q16).

$$Xj\_out^{*} = Xj\_out + \Delta Xj \times (1 - F1(t)) \quad (q18)$$

Here, ΔXj is a change amount of the target color component due to the non-input-color removal or the non-input-color suppression, and is a negative value.

The above formula (q16) is a process of obtaining the corrected value of the target color component by multiplying the value Xj_out of the target color component in the output value by the coefficient F1(t) less than 1, which increases as the value of the target color component in the input value increases. Meanwhile, the above formula (q18) is a process of obtaining a corrected value of the target color component by multiplying the change amount ΔXj of the target color component due to non-input-color removal or non-input-color suppression by a coefficient (1−F1(t)) less than 1 that decreases as a value of a target color component in an input value increases, and adding a multiplication result to the value Xj_out of the target color component in an output value. These two processes are equivalent to each other because the same result is obtained by adjusting the correction coefficient F1(t) in the formulas (q16) and (q18) as necessary.

In the spreading correction, the non-target-color component is corrected in a manner of compensating for a reduction in the target color component due to the spreading correction, for example. Specifically, the non-target-color component can be corrected according to any one of the formulas (q1) to (q3) described in the first embodiment.

FIG. 19 is a diagram showing an example of a process including spreading correction when the C component is set as the target color component. The "corrected output value" is an output value to which the non-input-color removal and the spreading correction are applied. In the "corrected output value", a number surrounded by a circle is a value of a color component changed by non-input-color removal, a number surrounded by a double frame is a value of a color component changed by non-target-color component correction, and a number surrounded by a thick frame is a value of a color component changed by spreading correction. At the input point P11, the C component in the input value is 0, the non-input-color removal is applied to the C component, and the non-target-color component correction is applied to the M component and the Y component. Since the input point P12 is present within the spreading correction range SCRc, the spreading correction is applied to the C component, and the non-target-color component correction is applied to the M component and the Y component. That is, in a corrected output value of the input point P12, the C component decreases due to the spreading correction, and the M component and the Y component increase in a manner of compensating for the reduction amount. As a result, a color difference between a color represented by a corrected output value of the input point P11 and a color represented by the corrected output value of the input point P12 is smaller than when no spreading correction is performed.

In the example in FIG. 19, an input value of the input point P11 corresponds to a "first type input value representing a color not including the target color component". An input value of the input point P12 corresponds to a "second type input value within a spreading correction range".

Figure 20:
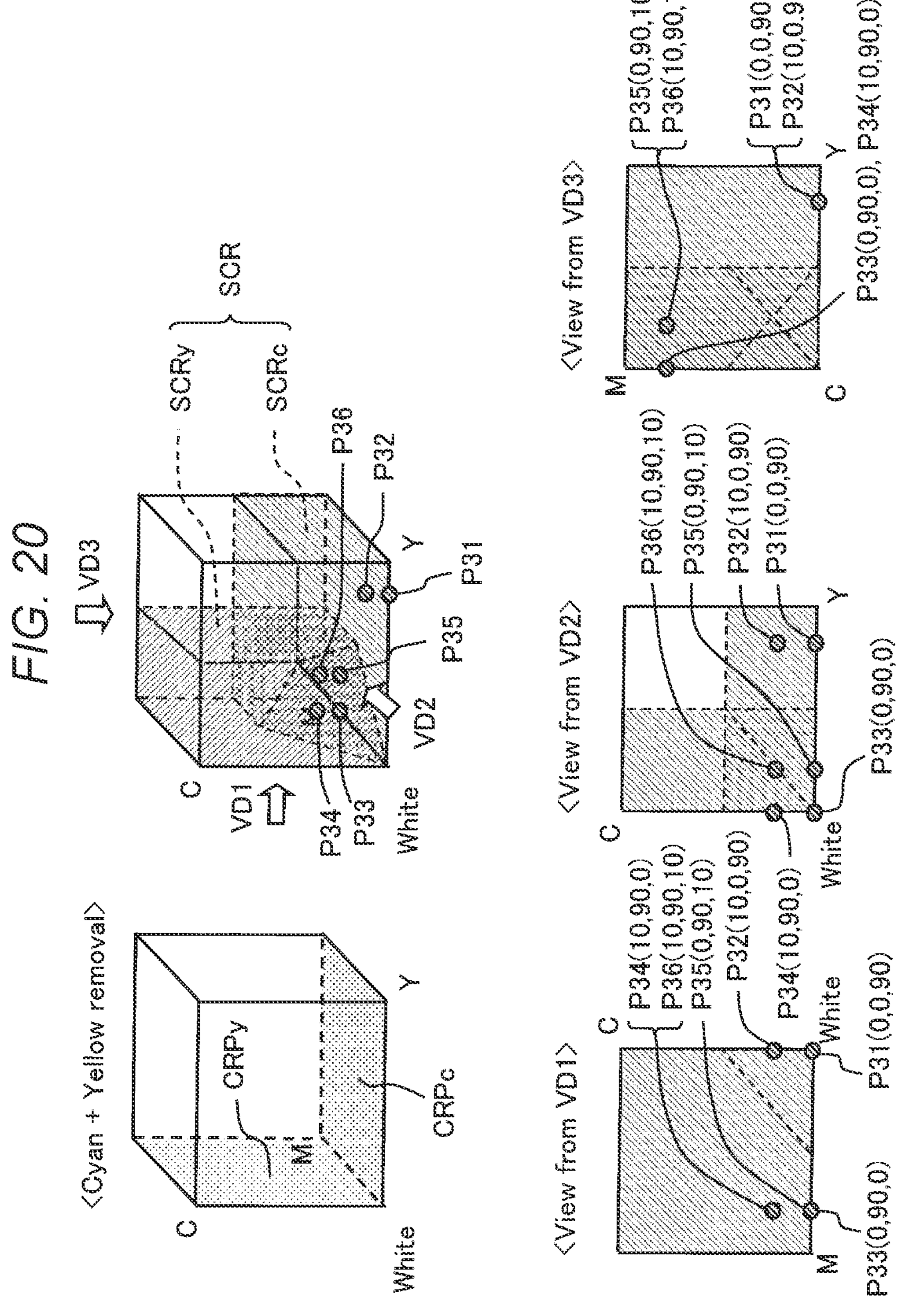
FIG. 20 is a diagram showing a spreading correction range when CY components are set as target color components.

FIG. 20 is a diagram showing the spreading correction range SCR when the C component and the Y component are set as the target color components. The spreading correction range SCR corresponds to a sum of the spreading correction range SCRc for the C component and a spreading correction range SCRy for the Y component. FIG. 20 shows six input points P31 to P36.

FIG. 21 is a diagram showing an example of a process including spreading correction when the C component and the Y component are set as the target color components. Application states of the non-input removal, the non-target-color component correction, and the spreading correction for the six input points P31 to P36 in FIG. 20 are as follows.

(1) Input point P31: since the C component in the input value is 0, the non-input-color removal is applied to the C component, and the non-target-color component correction is applied to the M component and the Y component.

(2) Input point P32: since the input point P32 is present within the spreading correction range SCRc, the spreading correction is applied to the C component, and the non-target-color component correction is applied to the M component and the Y component.

(3) Input point P33: since the C component and the Y component in the input value are 0, the non-input-color removal is applied to the C component and the Y component, and the non-target-color component correction is applied to the M component.

(4) Input point P34: since the Y component in the input value is 0, and the Y component is present within the spreading correction range SCRc, the non-input-color removal is applied to the Y component, spreading correction is applied to the C component, and non-target-color component correction is applied to the M component.

(5) Input point P35: since the C component in the input value is 0, and the C component is present within the spreading correction range SCRy, the non-input-color removal is applied to the C component, the spreading correction is applied to the Y component, and the non-target-color component correction is applied to the M component.

(6) Input point P36: since the input point P36 is present in both the spreading correction range SCRc and the spreading correction range SCRy, and the spreading correction is applied to the C component and the Y component, and the non-target-color component correction is applied to the M component.

The input point P36 is an example in which spreading correction is applied to two color components. The spreading correction can be similarly applied to three or more color components. In general, when N is an integer of 2 or more, and when the target color component that is a target of the first correction process is N color components, the spreading correction range is set to include N spreading correction ranges that are in contact with N color removal planes in which one of the N color components is zero. When M is an integer of 2 or more and N or less, and when a position of an input value in an input color space is in M spreading correction ranges among N spreading correction ranges, an output value is corrected in a manner of correcting values of M color components among the N color components according to positions of input values in the M spreading correction ranges.

As described above, at the input point P34, the non-input-color removal is applied to one target color component, and the spreading correction is applied to the other target color component. The same applies to the input point P35. As described above, when a plurality of color components are selected as the target color components, the non-input-color removal and the spreading correction may be simultaneously applied to an output value obtained based on one input value. In this way, even when non-input-color removal is applied to a plurality of target color components, a color jump due to the non-input-color removal can be alleviated.

Figure 22:
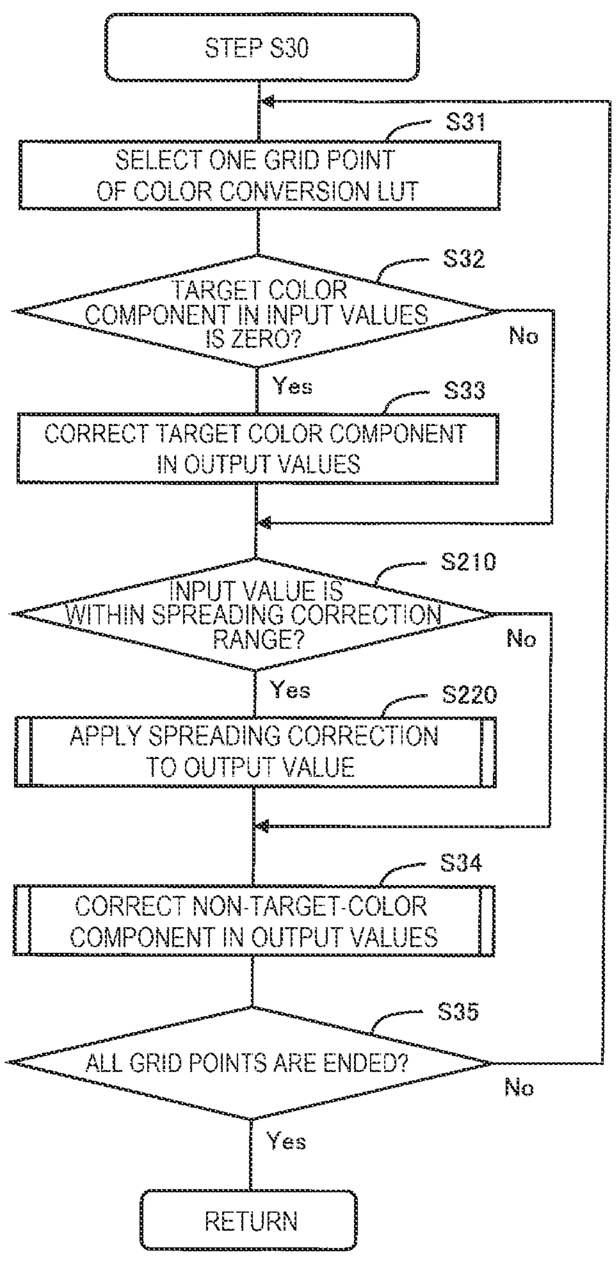
FIG. 22 is a flowchart showing a processing procedure of step S30 in the fourth embodiment.

FIG. 22 is a flowchart showing a processing procedure of step S30 in the fourth embodiment. A device configuration shown in FIGS. 1 and 2 is the same as that of the first embodiment. The processing procedure shown in FIG. 10 is also the same as those in the first embodiment. In the processing procedure in FIG. 22, step S210 and step S220 are added between step S33 and step S34 in FIG. 11, and the other steps are the same as those of the first embodiment.

In step S210, the correction unit 120 determines whether the input value is within the spreading correction range. When the input value is outside the spreading correction range, the process proceeds to step S34. Meanwhile, when the input value is within the spreading correction range, that is, when the input value is the second type input value, the process proceeds to step S220, and the correction unit 120 applies spreading correction to the output value.

FIG. 23 is a flowchart showing a processing procedure of step S220 in the fourth embodiment. In step S410, the correction unit 120 obtains a spreading corrected value of the target color component by multiplying the value of the target color component in the output value by the coefficient F1(t) less than 1, which increases as the value of the target color component increases. This process is spreading correction using the above formula (q16) or formula (q18). In step S420, the correction unit 120 obtains a reduction amount of the target color component due to the spreading correction. In step S430, the correction unit 120 increases the non-target-color component to correct an output value in a manner of compensating for the reduction amount of the target color component. This process can be performed according to any one of the formulas (q1) to (q3) described in the first embodiment.

The process of step S430 is substantially the same as the non-target-color component correction in step S34 described in the first embodiment. Therefore, when step S430 is executed, the process of step S34 in FIG. 22 is skipped.

The fourth embodiment also achieves a similar effect as the first embodiment. According to the fourth embodiment, it is possible to prevent a large jump from appearing in a color represented by a corrected output value obtained by correcting an output value for the first type input value and a color represented by a corrected output value obtained by correcting an output value for the second type input value.

E. Fifth Embodiment

FIG. 24 is a flowchart showing a processing procedure of step S220 in a fifth embodiment. A device configuration shown in FIGS. 1 and 2 is the same as that of the first embodiment. The processing procedure shown in FIG. 10 is the same as that of the first embodiment. The processing procedure of step S30 shown in FIG. 22 is the same as that of the fourth embodiment. The fifth embodiment is different from the fourth embodiment in a spreading correction method in step S220. The spreading correction method according to the fifth embodiment is a method for spreading a change amount of each color component in a color correction process including non-input-color removal or non-input-color suppression and non-target-color component correction.

In step S510, the correction unit 120 obtains a change amount $\Delta X$ of each color component by a color correction process. The "color correction process" means a process including non-input-color removal or non-input-color suppression and non-target-color component correction. The change amount $\Delta X$ is a result of subtracting a value before the color correction process from a value after the color correction process, and is calculated for all the color components including the target color component and the non-target-color component. In a typical example, the change amount $\Delta X$ takes a negative value for the target color component, and takes a positive value for the non-target-color component.

In step S520, the correction unit 120 obtains the spreading correction amount $\{(1-F1(t)\times\Delta X\}$ of each color component by multiplying the change amount $\Delta X$ of each color component by the coefficient (1−F1(t)) less than 1, which decreases as a value of a target color component in the input value increases. The coefficient (1−F1(t)) is obtained by subtracting the correction coefficient F1(t) described in FIG. 18 from 1. The parameter t in the correction coefficient F1(t) is a value obtained by dividing the value $Xj\_in$ of the target color component in the input value by the maximum value $Xj\_max$ of the Xj coordinate values in the spreading correction range, similarly to the above-described formula (q17). That is, the coefficient (1−F1(t)) is a coefficient less than 1 that decreases as the value of the target color component in the input value increases.

In step S530, the correction unit 120 obtains the spreading corrected value of each color component by adding the spreading correction amount $\{(1-F1(t)\times\Delta X\}$ to a value of each color component in the output value. The spreading corrected value is a correction result of the spreading correction. The process of step S530 includes substantially the same process as the non-target-color component correction in step S34 described in the first embodiment. Therefore, in the fifth embodiment as well, when step S530 is executed, the process of step S34 in FIG. 22 is skipped.

The process in the fifth embodiment can also obtain a substantially similar result as the process in the fourth embodiment. The fifth embodiment also achieves a similar effect as the fourth embodiment.

F. Sixth Embodiment

Figure 25:
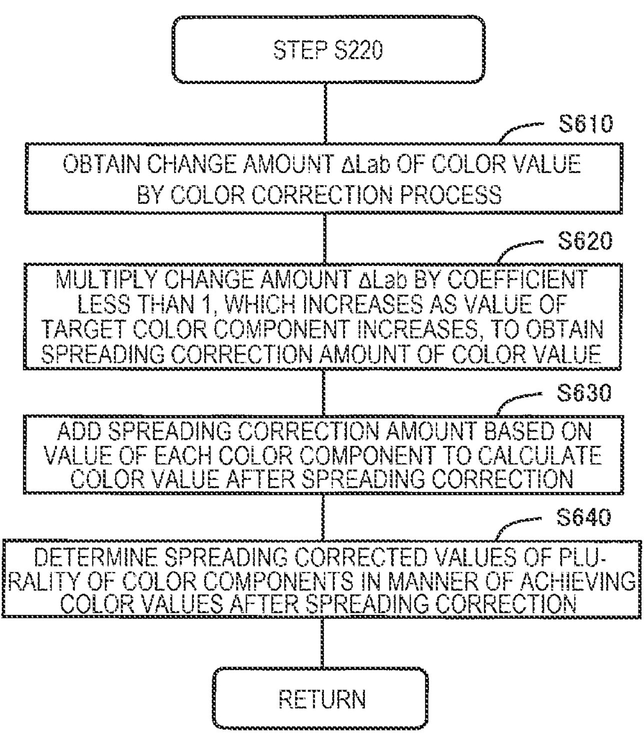
FIG. 25 is a flowchart showing a processing procedure of step S220 in a sixth embodiment.

FIG. 25 is a flowchart showing a processing procedure of step S220 in a sixth embodiment. A device configuration shown in FIGS. 1 and 2 is the same as that of the first embodiment. The processing procedure shown in FIG. 10 is the same as that of the first embodiment. The processing procedure of step S30 shown in FIG. 22 is the same as that of the fourth embodiment. The sixth embodiment is different from the fourth and fifth embodiments in the spreading correction method in step S220. The spreading correction method according to the fifth embodiment is a method for spreading a change amount of a color value in a color correction process including non-input-color removal or non-input-color suppression and non-target-color component correction.

In step S610, the correction unit 120 obtains a change amount ΔLab of a color value Lab as an output value by the color correction process. Here, the "color value" means three attribute values of the device-independent color space. In the embodiment, L*a*b* values of the CIE-L*a*b* color system are referred to as the "color value Lab". The "color correction process" means a process including non-input-color removal or non-input-color suppression and non-target-color component correction. The change amount ΔLab includes a change amount of an L* component, a change amount of an a* component, and a change amount of a b* component due to the color correction process. For example, when the color value Lab (40, 32, 15) before the color correction process is changed to the color value Lab (39, 36, 20) after the color correction, the change amount ΔLab becomes (−1, +4, +5).

In step S620, the correction unit 120 obtains a spreading correction amount {(1−F1(t)×ΔLab} of the color value Lab by multiplying the change amount ΔLab of the color value Lab by the coefficient (1−F1(t)) less than 1, which decreases as the value of the target color component in the input value increases.

In step S630, the correction unit 120 obtains a color value after the spreading correction by adding the spreading correction amount {(1−F1(t)×ΔLab} to the color value Lab as the output value.

In step S640, the correction unit 120 determines spreading corrected values of a plurality of color components in a manner of achieving the color values after the spreading correction. The process of step S640 can be executed using, for example, an optimization process in which a difference between the color value after the spreading correction and the color value achieved by the spreading corrected values of the plurality of color components is used as an objective function. In the process of step S640, a constraint condition may be provided that for a color component in which the input value has a value of 0, the spreading corrected value is 0. The process of step S640 includes substantially the same process as the non-target-color component correction in step S34 described in the first embodiment. Therefore, in the sixth embodiment as well, when step S640 is executed, the process of step S34 in FIG. 22 is skipped.

The process in the sixth embodiment can also obtain a substantially similar result as the processes in the fourth embodiment and the fifth embodiment. In the sixth embodiment, it is possible to prevent a large jump from occurring in the color value by spreading the change amount of the color value.

G. Seventh Embodiment

In the fourth embodiment described above, the non-input-color removal is executed on the target color component, but in a seventh embodiment, the non-input-color suppression described in the third embodiment is executed instead of the non-input-color removal.

When the non-input-color suppression is applied to the target color component, the spreading correction of the target color component is executed according to the following formula instead of the above formulas (q16) and (q17).

$$Xj\_out^* = Xj\_out \times F2(t) \tag{q19}$$

-continued $$F2(t) = (1 - Dc/Do) \times F1(t) + (Dc/Do) \tag{q20}$$

$$t = Xj\_in/Xj\_max \tag{q21}$$

Figure 26:
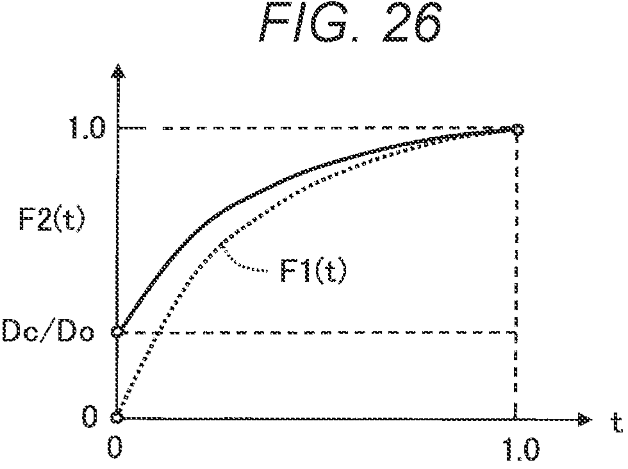
FIG. 26 is a diagram showing a correction coefficient used in a seventh embodiment.

FIG. 26 is a diagram showing the correction coefficient F2 (t) given by the above formula (q20). The correction coefficient F2 (t) corresponds to a value obtained by compressing a range of the value of the correction coefficient F1(t) shown in FIG. 18 by (1−Dc/Do) times and adding (Dc/Do). FIG. 26 also shows a graph of the correction coefficient F1(t) shown in FIG. 18. It can be understood that the value of the correction coefficient F2 (t) is larger than the value of the correction coefficient F1(t) for the same parameter t. By using such a correction coefficient F2 (t), the color correction can be executed so that the color to which the non-input-color suppression is applied and the color to which the spreading correction is applied smoothly change.

FIG. 27 is a diagram showing an example of a color correction process according to the seventh embodiment. The device configuration and the processing procedure are the same as those of the fourth embodiment. The example in FIG. 27 corresponds to a result in which, with respect to the example shown in FIG. the non-input-color suppression is applied in accordance with the above formula (q12) instead of the non-input-color removal and the spreading correction is applied in accordance with the above formulas (q19) to (q21). In this example, k1=0.5 and Dmax=3 [%].

The seventh embodiment achieves a substantially similar effect as the fourth embodiment. According to the seventh embodiment, when the target color component is not in the color represented by the input value, the target color component in the output value is reduced, and thus it is possible to prevent occurrence of color turbidity and graininess, and it is possible to reduce a change in a color due to the correction on the output value.

Other Aspects

The present disclosure is not limited to the embodiments described above, and can be implemented in various aspects without departing from the spirit of the present disclosure. For example, the present disclosure can be implemented in the following aspects. In order to solve a part of or all of problems of the present disclosure, or to achieve a part of or all of effects of the present disclosure, technical features of the embodiments described above corresponding to technical features in the following aspects can be replaced or combined as appropriate. Unless the technical features are explained as essential technical features in the specification, the technical features can be deleted as appropriate.

(1) According to a first aspect of the present disclosure, a color correction device is provided. A color correction device includes: a color conversion unit configured to convert an input value in an input color space into an output value in an output color space; a selection unit configured to receive a selection, as a target color component, of one or more color components among a plurality of color components used in a printing device; and a correction unit configured to execute a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component among the plurality of color components.

According to the color correction device, when the target color component is not in the color represented by the input value, the target color component in the output value is reduced, and thus it is possible to prevent occurrence of color turbidity and graininess. Since one or more target color components can be selected, a correction process can be executed for a desired number of target color components. By performing non-target-color component correction, it is possible to prevent colors from being excessively different due to the correction.

(2) In the color correction device, the correction unit may calculate a correction amount of the non-target-color in component the non-target-color component correction according to a reduction amount of the target color component.

According to the color correction device, the correction amount of the non-target-color component can be appropriately determined.

(3) In the color correction device, the correction unit may execute the non-target-color component correction by multiplying a value of the non-target-color component by a coefficient.

According to the color correction device, the non-target-color component can be appropriately corrected.

(4) In the color correction device, the selection unit may be configured to receive a selection of any one of a color difference, a brightness difference, and a saturation difference as the color difference.

According to the color correction device, one of the color difference, the brightness difference, and the saturation difference can be reduced.

(5) In the above color correction device, the correction unit may further execute, when the input value is a second type input value within a spreading correction range set around the first type input value in the input color space, a second correction process of correcting a second type output value corresponding to the second type input value according to a position of the second type input value within the spreading correction range.

According to the color correction device, it is possible to prevent a large jump from occurring in the corrected color by applying, to an output value, correction suitable for each of the first type input value representing a color not including the target color component and the second type input value within the spreading correction range set around the first type input value.

(6) In the color correction device, the spreading correction range may be in contact with a color removal plane in which the target color component is zero, and may be set in a manner of extending to a position where a distance from the color removal plane is equal to a smaller value of a total value of color components other than the target color component in the first type input value and a preset limit value.

According to the color correction device, the spreading correction range can be set to an appropriate range.

(7) In the color correction device, the second correction process may be a process of (d1) obtaining a spreading corrected value of the target color component in the second type output value by multiplying a value of the target color component by a coefficient less than 1, which increases as a value of the target color component in the second type input value increases, (d2) obtaining a reduction amount of the target color component based on the spreading corrected value, and (d3) correcting the second type output value in a manner of compensating for the reduction amount by increasing the non-target-color component.

According to the color correction device, it is possible to prevent a large jump from appearing in a color represented by a corrected output value obtained by correcting an output value for the first type input value and a color represented by a corrected output value obtained by correcting an output value for the second type input value.

(8) In the color correction device, the second correction process may be a process of (d1) obtaining a change amount of each color component in the first type output value by the first correction process, (d2) obtaining a spreading correction amount of the each color component by multiplying the change amount of the each color component by a coefficient less than 1, which decreases as a value of the target color component in the second type input value increases, and (d3) correcting the second type output value in a manner of adding the spreading correction amount to a value of the each color component.

According to the color correction device, it is possible to prevent a large jump from appearing in a color represented by a corrected output value obtained by correcting an output value for the first type input value and a color represented by a corrected output value obtained by correcting an output value for the second type input value.

(9) In the color correction device, when three attribute values in a device-independent color space are defined as "color values", the second correction process may be a process of (d1) obtaining a change amount by the first correction process for a first color value calculated based on the first type output value, (d2) obtaining a spreading correction amount by multiplying the change amount by a coefficient less than 1, which decreases as a value of the target color component in the second type input value increases, (d3) obtaining a corrected color value of the second type output value by adding the spreading correction amount to a second color value calculated based on the second type output value, and (d4) correcting the second type output value in a manner of achieving the corrected color value.

According to the color correction device, it is possible to prevent a large jump from appearing in a color represented by a corrected output value obtained by correcting an output value for the first type input value and a color value represented by a corrected output value obtained by correcting an output value for the second type input value.

(10) In the color correction device, the correction of the first type output value of reducing the target color component may be a process of correcting the first type output value in a manner of changing a value of the target color component to a corrected value that is not zero.

According to the color correction device, it is possible to reduce a change in color due to correction of an output value.

(11) In the color correction device, the color conversion unit may include a color conversion lookup table for converting the input color space into the output color space, and the correction unit may execute the first correction process on the color conversion lookup table.

According to the color correction device, it is possible to execute an appropriate color conversion using a corrected color conversion lookup table.

(12) According to a second aspect of the present disclosure, a printing system including a color correction device and a printing device is provided. The color correction device includes a color conversion unit configured to convert an input value in an input color space into an output value in an output color space, a selection unit configured to receive a selection, as a target color component, of one or more color components among a plurality of color components used in the printing device, a correction unit configured to execute a first correction process of correcting, when the input value is a first type input value representing a color not including the target color component, a first type output value corresponding to the first type input value in a manner of reducing the target color component, and a printing data generation unit configured to generate printing data to be supplied to the printing device using a corrected output value corrected by the correction unit. The first correction process includes non-target-color component correction of reducing a color difference between before and after correction by correcting an output value component corresponding to a non-target-color component that is a color component other than the target color component among the plurality of color components.

(13) According to a third aspect of the present disclosure, a color correction method is provided. The color correction method includes: (a) converting an input value in an input color space into an output value in an output color space; (b) receiving a selection, as a target color component, of one or more color components among a plurality of color components used in a printing device; and (c) executing a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component among the plurality of color components.

(14) According to a fourth aspect of the present disclosure, a non-transitory computer-readable storage medium storing a program is provided. The program causes a computer to execute: (a) a process of converting an input value in an input color space into an output value in an output color space; (b) a process of receiving a selection, as a target color component, of one or more color components among a plurality of color components used in a printing device; and (c) a first correction process of correcting, when the input value is a first type input value representing a color not including the target color component, a first type output value corresponding to the first type input value in a manner of reducing the target color component. The first correction process includes non-target-color component correction of reducing a color difference between before and after correction by correcting an output value component corresponding to a non-target-color component that is a color component other than the target color component among the plurality of color components.

The present disclosure can also be implemented in various forms other than the image processing device, the printing system, and the computer program. For example, the present disclosure can be implemented in the form of an image processing method or a non-transitory storage medium on which a computer program is recorded.

What is claimed is:

1. A color correction device comprising:

a color conversion unit configured to convert an input value in an input color space into an output value in an output color space;

a selection unit configured to receive a selection, as a target color component, of one or more color components among a plurality of color components used in a printing device; and a correction unit configured to execute a first correction process of correcting, when the input value is a first type input value representing a color not including the target color component, a first type output value corresponding to the first type input value in a manner of reducing the target color component, wherein the first correction process includes non-target-color component correction of reducing a color difference between before and after correction by correcting an output value component corresponding to a non-target-color component that is a color component other than the target color component among the plurality of color components.

2. The color correction device according to claim 1, wherein the correction unit calculates a correction amount of the non-target-color component in the non-target-color component correction according to a reduction amount of the target color component.

3. The color correction device according to claim 1, wherein the correction unit executes the non-target-color component correction by multiplying a value of the non-target-color component by a coefficient.

4. The color correction device according to claim 1, wherein the selection unit is configured to receive a selection of any one of a color difference, a brightness difference, and a saturation difference as the color difference.

5. The color correction device according to claim 1, wherein the correction unit further executes, when the input value is a second type input value within a spreading correction range set around the first type input value in the input color space, a second correction process of correcting a second type output value corresponding to the second type input value according to a position of the second type input value within the spreading correction range.

6. The color correction device according to claim 5, wherein the spreading correction range is in contact with a color removal plane in which the target color component is zero, and is set in a manner of extending to a position where a distance from the color removal plane is equal to a smaller value of a total value of color components other than the target color component in the first type input value and a preset limit value.

7. The color correction device according to claim 5, wherein the second correction process is a process of (d1) obtaining a spreading corrected value of the target color component in the second type output value by multiplying a value of the target color component by a coefficient less than 1, which increases as a value of the target color component in the second type input value increases, (d2) obtaining a reduction amount of the target color component based on the spreading corrected value, and (d3) correcting the second type output value in a manner of compensating for the reduction amount by increasing the non-target-color component.

8. The color correction device according to claim 5, wherein the second correction process is a process of (d1) obtaining a change amount of each color component in the first type output value by the first correction process, (d2) obtaining a spreading correction amount of the each color component by multiplying the change amount of the each color component by a coefficient less than 1, which decreases as a value of the target color component in the second type input value increases, and (d3) correcting the second type output value in a manner of adding the spreading correction amount to a value of the each color component.

9. The color correction device according to claim 5, wherein when three attribute values in a device-independent color space are defined as color values, the second correction process is a process of (d1) obtaining a change amount by the first correction process for a first color value calculated based on the first type output value, (d2) obtaining a spreading correction amount by multiplying the change amount by a coefficient less than 1, which decreases as a value of the target color component in the second type input value increases, (d3) obtaining a corrected color value of the second type output value by adding the spreading correction amount to a second color value calculated based on the second type output value, and (d4) correcting the second type output value in a manner of achieving the corrected color value.

10. The color correction device according to claim 1, wherein the correction of the first type output value of reducing the target color component is a process of correcting the first type output value in a manner of changing a value of the target color component to a corrected value that is not zero.

11. The color correction device according to claim 1, wherein the color conversion unit includes a color conversion lookup table for converting the input color space into the output color space, and the correction unit executes the first correction process on the color conversion lookup table.

12. A printing system comprising:

a color correction device; and a printing device, wherein the color correction device includes a color conversion unit configured to convert an input value in an input color space into an output value in an output color space, a selection unit configured to receive a selection, as a target color component, of one or more color components among a plurality of color components used in the printing device, a correction unit configured to execute a first correction process of correcting, when the input value is a first type input value representing a color not including the target color component, a first type output value corresponding to the first type input value in a manner of reducing the target color component, and a printing data generation unit configured to generate printing data to be supplied to the printing device using a corrected output value corrected by the correction unit, and the first correction process includes non-target-color component correction of reducing a color difference between before and after correction by correcting an output value component corresponding to a non-target-color component that is a color component other than the target color component among the plurality of color components.

13. A color correction method comprising:

(a) converting an input value in an input color space into an output value in an output color space;

(b) receiving a selection, as a target color component, of one or more color components among a plurality of color components used in a printing device; and (c) executing a first correction process of correcting, when the input value is a first type input value representing color not including the target color component, a first type output value corresponding to the first type input value in a manner of reducing the target color component, wherein the first correction process includes non-target-color component correction of reducing a color difference between before and after correction by correcting an output value component corresponding to a non-target-color component that is a color component other than the target color component among the plurality of color components.

14. A non-transitory computer-readable storage medium storing a program, the program causing a computer to execute:

(a) a process of converting an input value in an input color space into an output value in an output color space;

(b) a process of receiving a selection, as a target color component, of one or more color components among a plurality of color components used in a printing device; and (c) a first correction process of correcting, when the input value is a first type input value representing a color not including the target color component, a first type output value corresponding to the first type input value in a manner of reducing the target color component, wherein the first correction process includes non-target-color component correction of reducing a color difference between before and after correction by correcting an output value component corresponding to a non-target-color component that is a color component other than the target color component among the plurality of color components.

* * * * *